(12) United States Patent
Matsumoto

(10) Patent No.: US 9,527,590 B2
(45) Date of Patent: Dec. 27, 2016

(54) CRADLE DEVICE

(71) Applicant: Panasonic Intellectual Property Management Co., Ltd., Osaka (JP)

(72) Inventor: Masaharu Matsumoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/053,714

(22) Filed: Feb. 25, 2016

(65) Prior Publication Data

US 2016/0264244 A1 Sep. 15, 2016

(30) Foreign Application Priority Data

Mar. 12, 2015 (JP) ................. 2015-049288

(51) Int. Cl.
- *H04M 1/00* (2006.01)
- *B64D 11/00* (2006.01)
- *H04M 1/15* (2006.01)
- *H04M 1/11* (2006.01)

(52) U.S. Cl.
CPC ..... *B64D 11/00152* (2014.12); *B64D 11/0015* (2013.01); *H04M 1/11* (2013.01); *H04M 1/15* (2013.01)

(58) Field of Classification Search
CPC ............ H04M 1/04; H04M 1/11; H04M 1/15; H04M 1/6075; B64D 11/00152; B64D 11/015; B60R 11/0241; B60R 2011/0071; B60R 2011/0078
See application file for complete search history.

(56) References Cited

U.S. PATENT DOCUMENTS

| 5,931,527 A * | 8/1999 | D'Onofrio | B60N 3/004 297/146 |
|---|---|---|---|
| 2002/0190823 A1 | 12/2002 | Yap | |
| 2004/0128677 A1 | 7/2004 | Matsui et al. | |
| 2006/0075934 A1* | 4/2006 | Ram | B60N 3/004 108/44 |
| 2008/0246320 A1* | 10/2008 | Chang | B60R 11/0235 297/217.3 |

(Continued)

FOREIGN PATENT DOCUMENTS

| JP | 2003-058312 | 2/2003 |
|---|---|---|
| JP | 2003-069682 | 3/2003 |

(Continued)

*Primary Examiner* — Tuan D Nguyen
(74) *Attorney, Agent, or Firm* — McDermott Will & Emery LLP

(57) ABSTRACT

A cradle device of the present disclosure includes a tray, a main body, a pop-up mechanism, and a magnet. The pop-up mechanism is disposed on the main body and moves the tray from a stowing position to a taking-out position. The magnet is disposed in the main body at a side opposite to a mounting face of the tray. In a case of taking out the handset is, the magnet attracts the handset toward the tray from the stowing position to the taking-out position and moves to a predetermined retracting position when the handset is taken out of the tray. In a case of returning the handset to the tray, the magnet moves from the retracting position to an attracting position at which the handset is attracted toward the tray when the handset is pushed into the stowing position.

14 Claims, 19 Drawing Sheets

(56) References Cited

U.S. PATENT DOCUMENTS

| 2014/0055933 A1 | 2/2014 | Waki et al. | |
| 2015/0036060 A1* | 2/2015 | Yaghoubi | B60N 2/01 348/837 |
| 2016/0176357 A1* | 6/2016 | Maslakow | F16B 1/00 224/275 |

FOREIGN PATENT DOCUMENTS

| JP | 2004-152431 | 5/2004 |
| JP | 2012-238999 | 12/2012 |

* cited by examiner

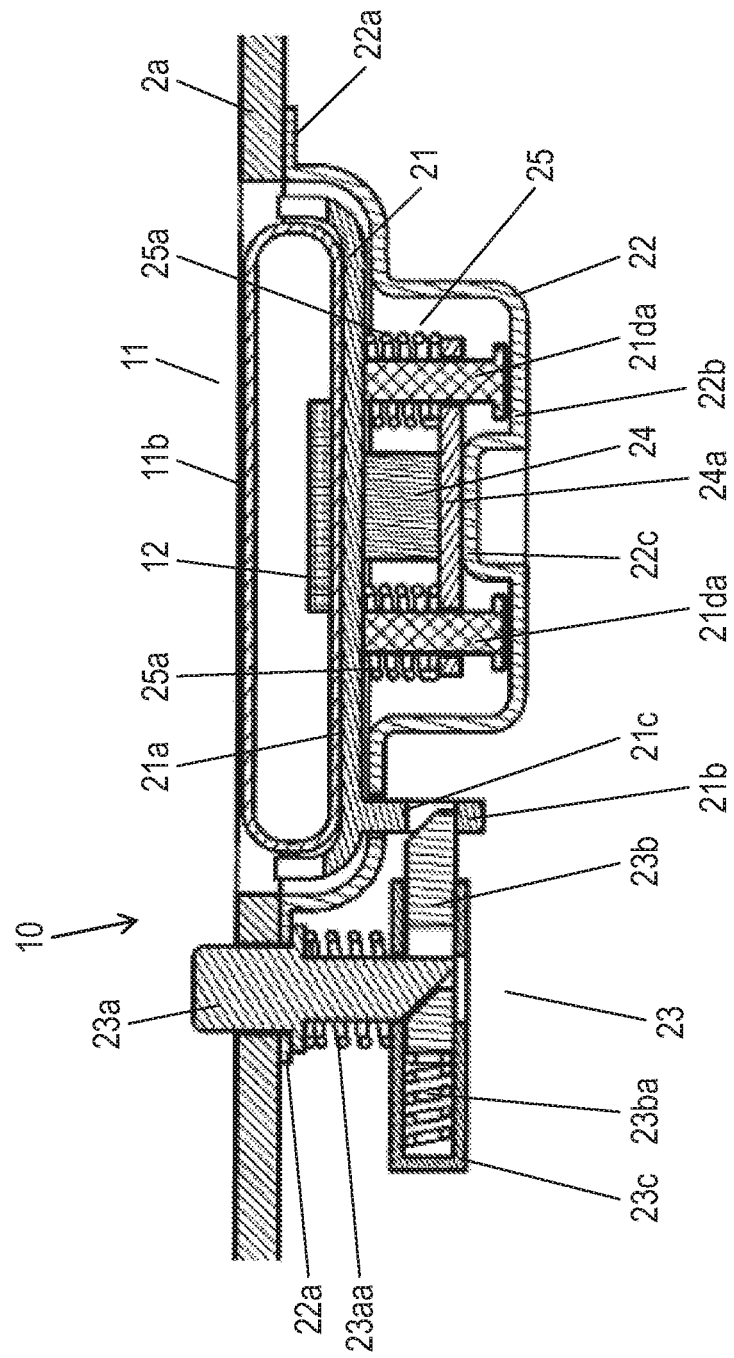

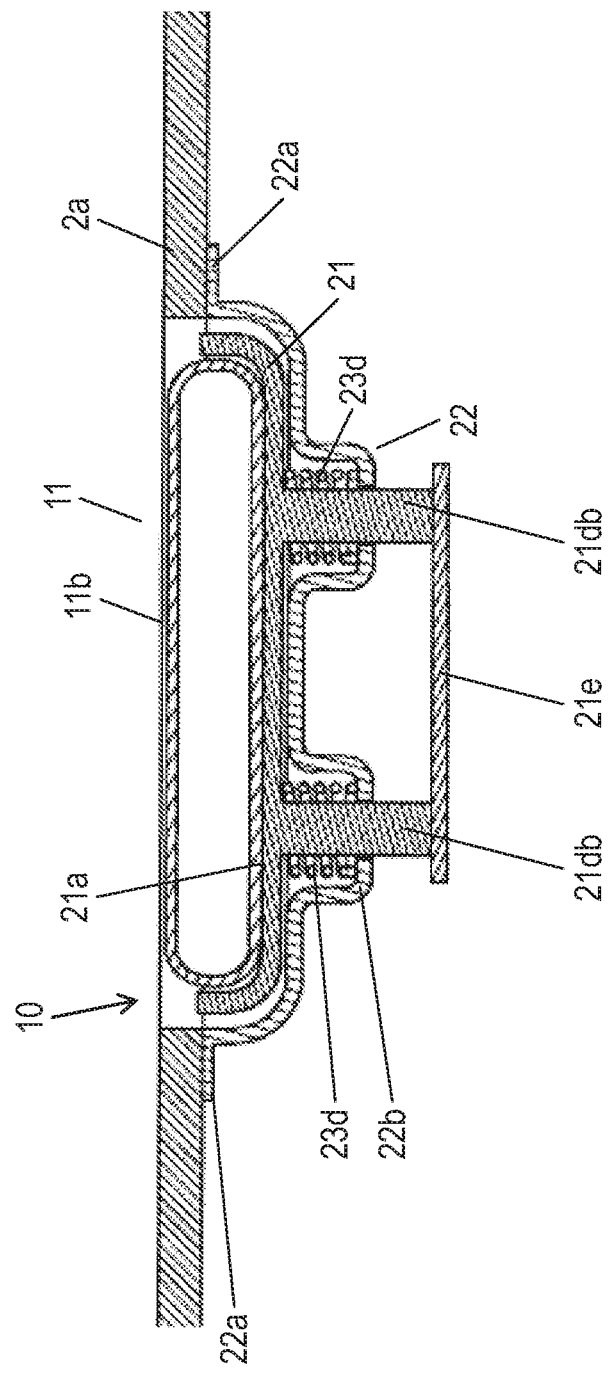

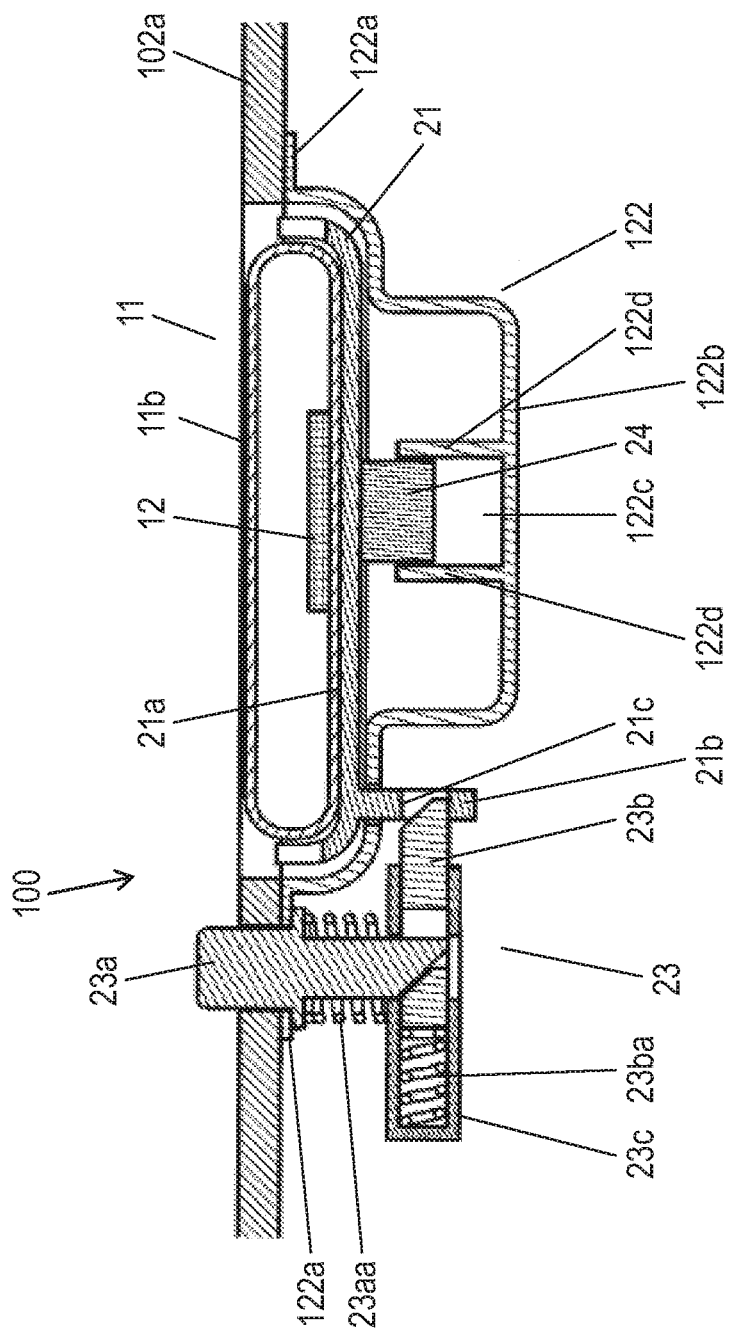

CRADLE DEVICE

BACKGROUND

1. Technical Field

The present disclosure relates to a cradle device to which a terminal device is attached.

2. Description of the Related Art

A cradle device which stows a terminal device (handset) for operating various entertainment systems is disposed around each seat installed in a cabin of an airplane. For example, Unexamined Japanese Patent Publication No. 2003-69682 discloses an operation terminal device that intermediately holds a handset by a latch member disposed on a cradle when, in the terminal device mounted on, for example, an airplane, a user depresses an operation button to shift the terminal device from a stowing position at which the handset is stowed to a pop-up position at which the handset can be taken out. Accordingly, the handset and the cradle device make it possible to prevent the handset from dropping onto a seat when taken out.

SUMMARY

A cradle device according to the present disclosure is a cradle device to which a terminal device is attached and provided with a tray, a main body, a pop-up mechanism, and an attraction member. The tray has a mounting face on which the terminal device is mounted. The main body is disposed on an attachment face and supports the tray from a side opposite to the mounting face. The pop-up mechanism is disposed on the main body and moves the tray from a stowing position, at which the terminal device is stowed within the attachment face, to a taking-out position at which the terminal device is lifted with respect to the attachment face. The attraction member is disposed in the main body at a side opposite to the mounting face of the tray. In a case of taking out the terminal device, the attraction member attracts the terminal device toward the tray from the stowing position to the taking-out position and moves to a predetermined retracting position when the terminal device is taken out of the tray. In a case of returning the terminal device to the tray, the attraction member moves from the retracting position to an attracting position at which the terminal device is attracted toward the tray when the terminal device is pushed into the stowing position.

BRIEF DESCRIPTION OF DRAWINGS

FIG. 3 is a sectional view taken along line A-A of FIG. 2;

FIG. 4 is a sectional view taken along line B-B of FIG. 2;

FIG. 8 is a sectional view illustrating a state in which a handset is stowed in a cradle device according to a second exemplary embodiment of the present disclosure;

DETAILED DESCRIPTION

Hereinbelow, exemplary embodiments will be described in detail with reference to the drawings in an appropriate manner. However, unnecessarily detailed description may be omitted. For example, detailed description of an already well-known matter and overlapping description of substantially the same configurations may be omitted in order to avoid the following description from becoming unnecessarily redundant and to make it easy for a person skilled in the art to understand the following description.

The accompanying drawings and the following description are provided so that a person skilled in the art can sufficiently understand the present disclosure. Therefore, the accompanying drawings and the following description are not intended to limit the subject matter defined in the claims.

First Exemplary Embodiment

Cradle device 10 according to a first exemplary embodiment of the present disclosure will be described with reference to FIGS. 1 to 7D as follows.

Figure 1:
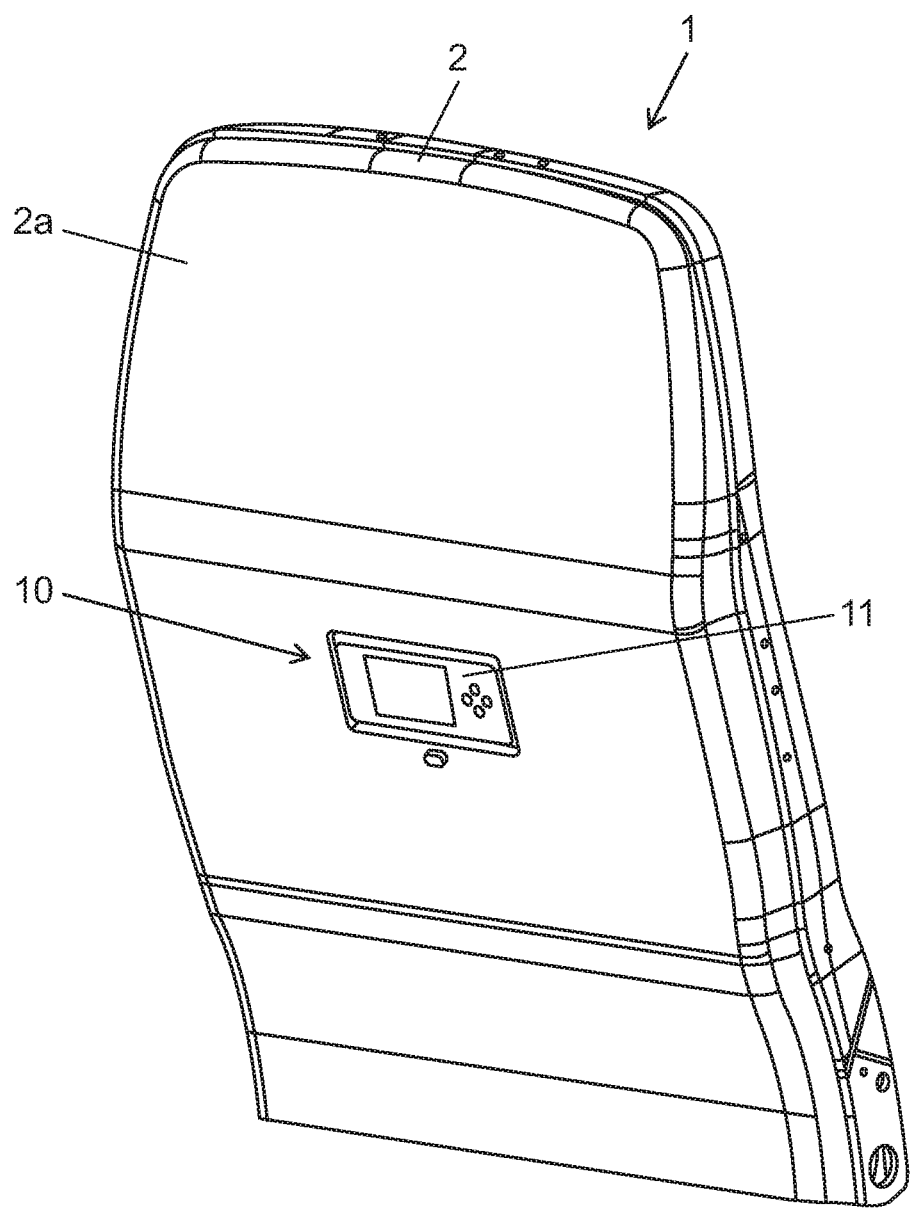
FIG. 1 is an overview diagram illustrating a configuration of a seat rear face in which a handset is stowed in a cradle device according to a first exemplary embodiment of the present disclosure.

FIG. 1 is an overview diagram illustrating a configuration of a seat rear face in which handset 11 is stowed in cradle device 10 according to the first exemplary embodiment of the present disclosure. Cradle device 10 according to the present exemplary embodiment is a device for stowing handset (terminal device) 11 and, for example, embedded in back face 2a of backrest 2 of each of a plurality of seats 1 installed in a cabin of an airplane as illustrated in FIG. 1. A passenger sitting on seat 1 behind each seat 1 takes out handset 11 placed in front of him/her from cradle device 10 and operates handset 11. Accordingly, the passenger can, for example, use an entertainment system installed in the cabin of the airplane or call a cabin crew.

Figure 2:
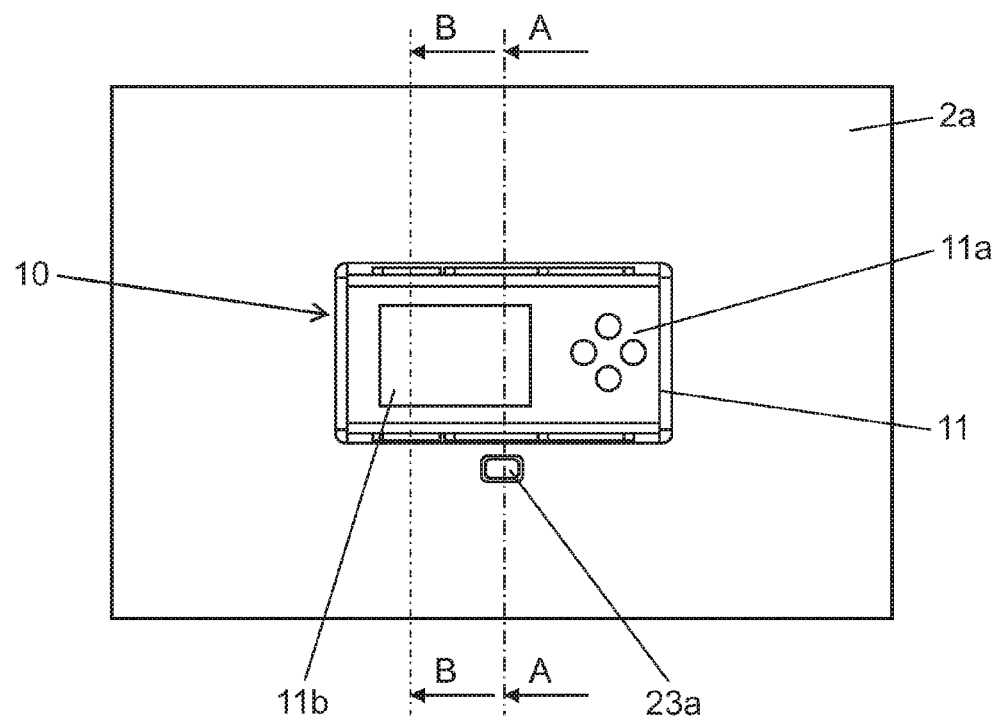
FIG. 2 is an enlarged view of the cradle device stowing the handset of FIG. 1.

FIG. 2 is an enlarged view of cradle device 10 stowing handset 11 of FIG. 1. As illustrated in FIG. 2, handset 11 is stowed in cradle device 10 embedded in back face 2a and has a plurality of operation buttons 11a and display screen 11b. Attraction plate 12 is disposed inside handset 11 and attracted by a magnetic force of a magnet (attraction member) which is disposed on cradle device 10 (described below).

Operation buttons 11a are used, for example, for various setting and selection of content in an entertainment system and for calling a cabin crew.

Display screen 11b displays, for example, a screen for various setting and a screen for selection of content in an entertainment system.

(Detailed Configuration of Cradle Device 10)

FIG. 3 is a sectional view taken along line A-A of FIG. 2. FIG. 4 is a sectional view taken along line B-B of FIG. 2. As illustrated in FIG. 3, attraction plate 12 is disposed on an inner wall face inside a casing of handset 11 at a side attached to cradle device 10. Attraction plate 12 is disposed on substantially a center inside handset 11 in the sectional view of FIG. 3. A position of attraction plate 12 is not limited to substantially the center inside handset 11. As illustrated in FIG. 3, cradle device 10 of the present exemplary embodiment is provided with tray 21, main body 22, pop-up mechanism 23, magnet 24, and retracting mechanism 25.

Tray 21 is, for example, a member made of resin. As illustrated in FIGS. 3 and 4, tray 21 includes mounting face 21a to which handset 11 is attached, lock receiver 21b, lock hole 21c, first and second legs 21da, 21db, and stopper 21e.

As illustrated in FIG. 3, mounting face 21a is formed along an outer shape of handset 11.

As illustrated in FIG. 3, lock receiver 21b is integrally formed with mounting face 21a in a manner to project along a direction substantially perpendicular to mounting face 21a from a rear face of tray 21, the rear face being located opposite to mounting face 21a. Lock hole 21c is formed on lock receiver 21b in a manner to penetrate lock receiver 21b along a direction parallel to mounting face 21a.

Lock hole 21c is a through hole into which a tip of locker 23b of pop-up mechanism 23 (described below) is insertable. When locker 23b is inserted into lock hole 21c, tray 21 is locked at a predetermined stowing position (refer to FIG. 3).

As illustrated in FIG. 3, first legs 21da, 21da are two columnar members which stand from the rear face of tray 21 along the direction substantially perpendicular to mounting face 21a. First legs 21da, 21da are disposed on substantially a center in a longitudinal direction of the rear face of tray 21 (refer to line A-A of FIG. 2). Each of first legs 21da, 21da is inserted into spring (first elastic member) 25a of retracting mechanism 25 (described below). Support plate 24a is attached to first legs 21da, 21da. Support plate 24a is movable along columnar portions of first legs 21da, 21da. Magnet 24 mounted on support plate 24a is arranged between first legs 21da, 21da.

As illustrated in FIG. 4, second legs 21db, 21db are integrally formed with mounting face 21a. As with first legs 21da, 21da, second legs 21db, 21db are two columnar members which stand from the rear face of tray 21 along the direction substantially perpendicular to mounting face 21a. Second legs 21db, 21db are disposed on an end in the longitudinal direction of the rear face of tray 21 (refer to line B-B of FIG. 2). Each of second legs 21db, 21db is inserted into spring (second elastic member) 23d of pop-up mechanism 23 (described below). Plate-like stopper 21e is attached to second legs 21db, 21db, specifically, fixed to columnar lower ends of second legs 21db, 21db.

Second legs 21db, 21db are disposed also on an opposite side of a position of line B-B illustrated in FIG. 2 in the longitudinal direction of handset 11. However, since a configuration of second legs 21db, 21db on the opposite side is the same as the configuration illustrated in FIG. 4, description thereof will be omitted.

Stopper 21e comes into contact with bottom 22b of main body 22 when tray 21 is lifted by pop-up mechanism 23 (described below) and shifted from the stowing position (refer to FIG. 5A) to a taking-out position (refer to FIG. 6C). Accordingly, a position of tray 21 is restricted by the contact between stopper 21e and bottom 22b. Thus, tray 21 can be held at a predetermined taking-out position.

As illustrated in FIG. 3, main body 22 is a receiving member which supports tray 21 from a lower side and houses first legs 21da, 21da, magnet 24, support plate 24a, springs 25a, 25a and the like in a space formed between main body 22 and the rear face of tray 21. Main body 22 includes fixing part 22a, bottom 22b, and projection (driving mechanism) 22c.

As illustrated in FIG. 3, fixing part 22a is a flange-like part which is formed in parallel to back face 2a (attachment face) of backrest 2 of seat 1 and fixed to an inner wall of back face 2a. Accordingly, main body 22 is attached to back face 2a of backrest 2 of seat 1.

As illustrated in FIG. 3, bottom 22b is a part which forms a bottom face of main body 22. First legs 21da, 21da are arranged on bottom 22b.

As illustrated in FIG. 3, projection 22c (driving mechanism) is a projecting part which is formed on a central part of bottom 22b of main body 22 and projects toward the rear face of tray 21. Projection 22c supports support plate 24a on which magnet 24 is mounted from the lower side at the stowing position to move magnet 24 to an attracting position.

A step of moving magnet 24 from a retracting position to the attracting position by projection 22c will be described in detail below.

Pop-up mechanism 23 shifts tray 21 from the stowing position to the taking-out position and, in contrast, from the taking-out position to the stowing position. As illustrated in FIG. 3, pop-up mechanism 23 includes release button 23a, spring 23aa, locker 23b, spring 23ba, case 23c, and springs 23d, 23d (refer to FIG. 4).

As illustrated in FIG. 2, release button (release unit) 23a is disposed directly under a space in which handset 11 is stowed in front view. As illustrated in FIG. 3, release button 23a projects from back face 2a. When release button 23a is depressed with tray 21 located at the stowing position, release button 23a retracts locker 23b to shift tray 21 from the stowing position to the taking-out position.

As illustrated in FIG. 3, spring 23aa is arranged between case 23c and fixing part 22a with a tubular lower end of release button 23a inserted inside spring 23aa. Spring 23aa applies a biasing force for pressing release button 23a toward fixing part 22a.

As illustrated in FIG. 3, locker 23b is a rod-like member which is arranged along a direction substantially parallel to back face 2a and movably housed inside case 23c. A tip part of locker 23b is removably arranged inside lock hole 21c formed on lock receiver 21b of tray 21. When the tip part of locker 23b is inserted into lock hole 21c, tray 21 is held at the stowing position.

As illustrated in FIG. 3, locker 23b has, near substantially a center in a longitudinal direction of locker 23b, an inclined face which abuts against an inclined face formed on a lower end of release button 23a.

Each of these inclined faces is formed at an angle of approximately 45° in sectional view. The angle of the inclined faces is not limited to 45°, and may be smaller than 45° or larger than 45°. Accordingly, when release button 23a is depressed and moved downward, locker 23b moves to retract by the inclined faces abutting against each other and lock of tray 21 by locker 23b is thereby released.

As illustrated in FIG. 3, spring 23ba is interposed between a rear end of locker 23b and a deepest part of case 23c inside case 23c. Spring 23ba biases locker 23b so as to allow the tip of locker 23b to be inserted into lock hole 21c of tray 21.

As illustrated in FIG. 3, case 23c is a bottomed tubular member and houses locker 23b and spring 23ba. Case 23c has a through hole into which a tip part of release button 23a is insertable. Accordingly, it is possible to allow the inclined face on the tip of release button 23a and the inclined face of locker 23b to abut against each other inside case 23c.

As illustrated in FIG. 4, springs (second elastic member) 23d, 23d are interposed between the rear face side of tray 21 and bottom 22b of main body 22 with second legs 21db, 21db inserted inside springs 23d, 23d. When release button 23a is depressed to release the lock of tray 21 by locker 23b, springs 23d, 23d push up tray 21 such that tray 21 springs out of back face 2a. Using a biasing force of springs 23d, 23d in this manner enables tray 21 to be shifted to a position at which handset 11 can be easily taken out, that is, to the taking-out position.

As illustrated in FIG. 3, magnet 24 is arranged near the rear face of tray 21 and attracts attraction plate 12 disposed inside handset 11 when tray 21 is located at the stowing position.

As illustrated in FIG. 3, support plate 24a has an upper face on which magnet 24 is mounted. Support plate 24a is attached to first legs 21da, 21da movably in an up-down direction in the figure.

Accordingly, as illustrated in FIG. 3, support plate 24a is located at a position separated from the rear face by a thickness of magnet 24 when magnet 24 and attraction plate 12 of handset 11 are attracted to each other.

On the other hand, when handset 11 is detached from mounting face 21a of tray 21 (refer to FIG. 6C), the attracted state between magnet 24 and attraction plate 12 is released. Accordingly, support plate 24a is separated from the rear face of tray 21 together with magnet 24 by an elastic force of springs 25a, 25a and moved to ends of first legs 21da, 21da.

When tray 21 is shifted from the stowing position (refer to FIG. 5A) to the taking-out position (refer to FIG. 6C) and handset 11 is detached from tray 21, retracting mechanism 25 moves magnet 24 from the attracting position to the retracting position. As illustrated in FIG. 3, retracting mechanism 25 has springs (first elastic member) 25a, 25a.

As illustrated in FIG. 3, springs 25a, 25a are arranged with first legs 21da, 21da, which are disposed on both right and left sides of magnet 24, inserted inside springs 25a, 25a in sectional view. Springs 25a, 25a are interposed between support plate 24a and the rear face of tray 21. Springs 25a, 25a bias support plate 24a to which magnet 24 is fixed in a direction away from the rear face of tray 21 by the elastic force.

An attraction force Fmg of magnet 24 is set to be larger than the elastic force Fsp of springs 25a, 25a (Fmg>Fsp).

Thus, when handset 11 is located at the stowing position (refer to FIG. 5A) of tray 21, magnet 24 is not separated from the rear face of tray 21 by springs 25a, 25a, but held in contact with the rear face by the attraction force of magnet 24 (attracting position).

When handset 11 is detached from the taking-out position (refer to FIG. 6C) of tray 21, the attraction force of magnet 24 does not act and magnet 24 is separated from the rear face of tray 21 by the elastic force of springs 25a, 25a (retracting position).

(Process of Taking Out Handset 11 from Cradle Device 10)

In cradle device 10 of the present exemplary embodiment, when handset 11 in a stowed state is taken out and used, tray 21 is shifted from the stowing position to the taking-out position by the following process.

Figure 5A:
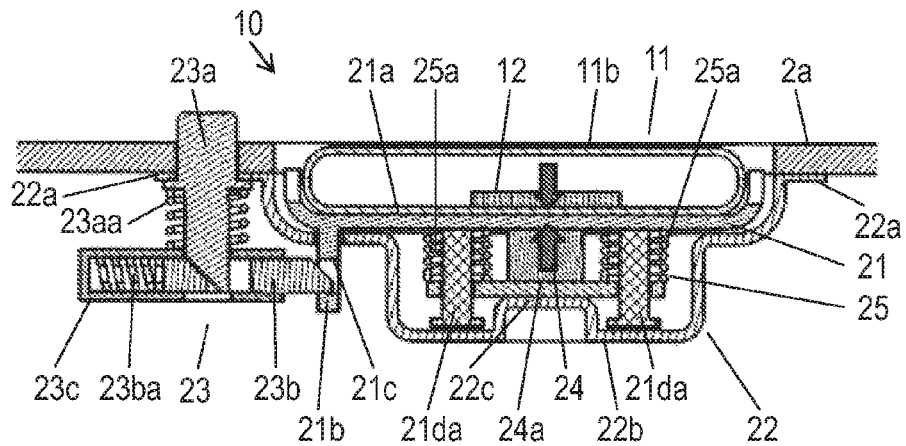
FIG. 5A is a sectional view illustrating a process of taking out the handset from the cradle device in a configuration of FIGS. 3 and 4.

FIGS. 5A to 5C and FIGS. 6A to 6C are sectional views illustrating a process of taking out handset 11 from cradle device 10 in a configuration in FIGS. 3 and 4. As illustrated in FIG. 5A, when handset 11 is set on mounting face 21a of tray 21 and tray 21 is located at the stowing position, attraction plate 12 inside handset 11 and magnet 24 are attracted to each other. Accordingly, handset 11 is attracted on tray 21 and thus prevented from dropping off back face 2a of backrest 2 of seat 1.

Figure 5B:
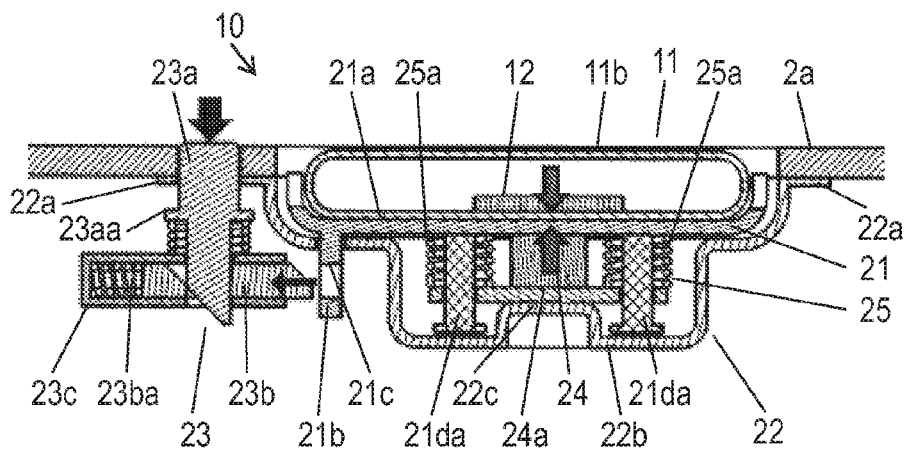
FIG. 5B is a sectional view illustrating the process of taking out the handset from the cradle device in the configuration of FIGS. 3 and 4.

Then, as illustrated in FIG. 5B, when a user depresses release button 23a, locker 23b moves to retract, and the tip of locker 23b is removed from lock hole 21c of tray 21.

Figure 5C:
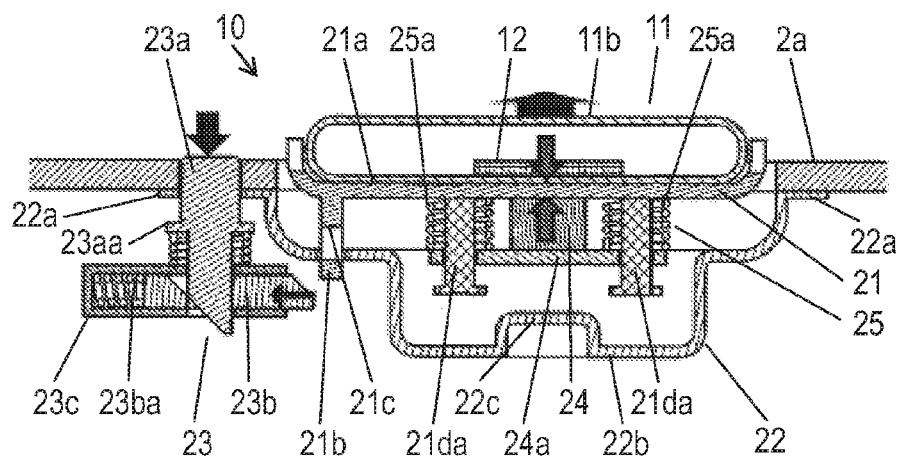
FIG. 5C is a sectional view illustrating the process of taking out the handset from the cradle device in the configuration of FIGS. 3 and 4.
Figure 6A:
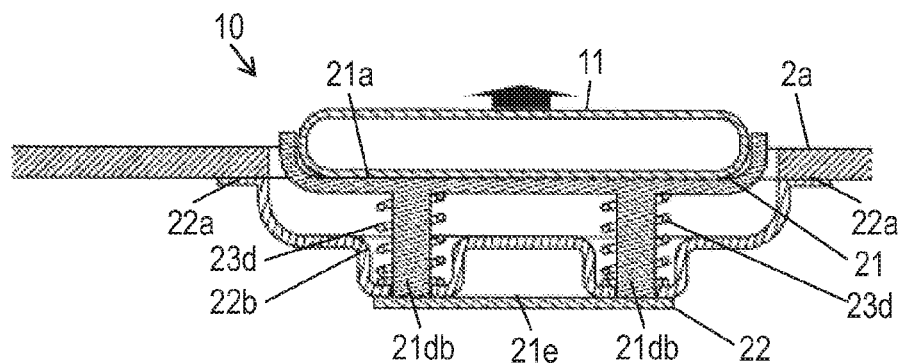
FIG. 6A is a sectional view illustrating the process of taking out the handset from the cradle device in the configuration of FIGS. 3 and 4.

Accordingly, as illustrated in FIG. 5C, the lock of tray 21 is released, and tray 21 moves to project from back face 2a by pop-up mechanism 23. As illustrated in FIG. 6A, the movement of tray 21 by pop-up mechanism 23 is caused by the elastic force of springs 23d, 23d contracted at the stowing position.

Figure 6B:
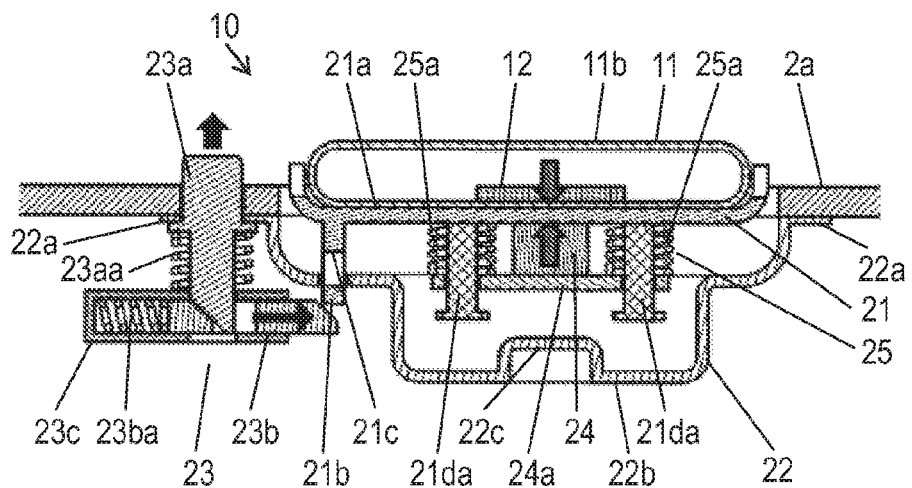
FIG. 6B is a sectional view illustrating the process of taking out the handset from the cradle device in the configuration of FIGS. 3 and 4.

Then, as illustrated in FIG. 6B, when the user moves his/her hand off release button 23a, release button 23a is returned to an initial position, and locker 23b interlocking with release button 23a is also returned to an initial position at which locker 23b is locked to lock hole 21c. At this point, since tray 21 has moved to the taking-out position, the tip of locker 23b is not inserted into lock hole 21c, but moves to a position directly under lock receiver 21b. In the state where tray 21 is shifted to the taking-out position, the attracted state between magnet 24 and attraction plate 12 inside handset 11 is maintained.

At this point, handset 11 is attracted to tray 21 also in a pop-up state. Thus, even when handset 11 is shifted to the pop-up state by an operation by a user, it is possible to prevent handset 11 from dropping onto, for example, a table. Since handset 11 is held on tray 21 only by the attraction force of magnet 24 in the pop-up state, a user can easily detach handset 11.

Figure 6C:
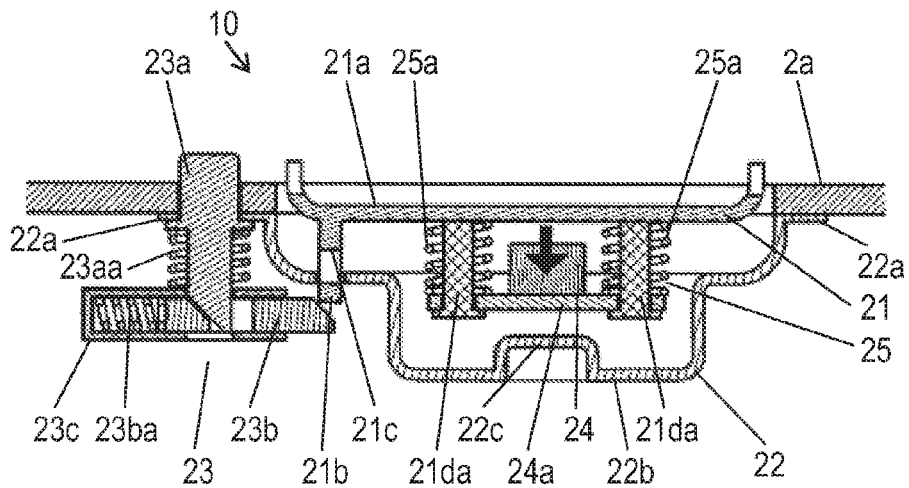
FIG. 6C is a sectional view illustrating the process of taking out the handset from the cradle device in the configuration of FIGS. 3 and 4.

Then, as illustrated in FIG. 6C, when the user detaches handset 11 from tray 21 at the taking-out position, attraction plate 12 inside handset 11 is separated from magnet 24. Accordingly, the attraction force of magnet 24 does not act, and support plate 24a moves in a direction away from tray 21 by the elastic force of springs 25a, 25a of retracting mechanism 25. Thus, magnet 24 fixed on support plate 24a moves to the predetermined retracting position illustrated in FIG. 6C.

(Process of Stowing Handset 11 in Cradle Device 10)

In cradle device 10 of the present exemplary embodiment, when a user stows handset 11 in cradle device 10 after use, handset 11 is shifted to the stowing position by the following process.

Figure 7A:
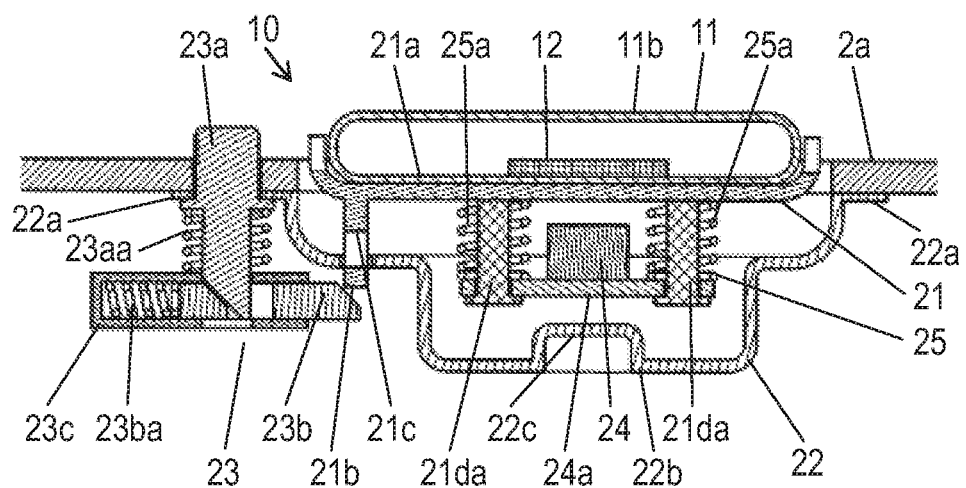
FIG. 7A is a sectional view illustrating a process of stowing the handset in the cradle device in the configuration of FIGS. 3 and 4.

FIGS. 7A to 7D are sectional views illustrating a process of stowing handset 11 in cradle device 10 in the configuration of FIGS. 3 and 4. As illustrated in FIG. 7A, a user first sets handset 11 on mounting face 21a of tray 21. At this point, merely setting handset 11 on mounting face 21a of tray 21 does not cause an attracted state between attraction plate 12 and magnet 24, and magnet 24 is maintained at the retracting position.

Figure 7B:
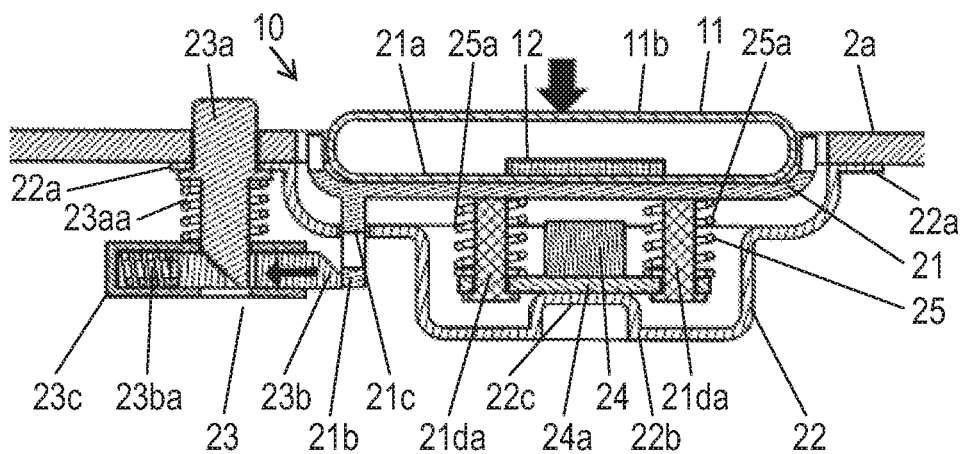
FIG. 7B is a sectional view illustrating the process of stowing the handset in the cradle device in the configuration of FIGS. 3 and 4.

Then, as illustrated in FIG. 7B, when the user pushes handset 11 toward back face 2a, a lower end of lock receiver 21b of tray 21 moves to a deep side of back face 2a while making contact with an inclined part formed on the tip of locker 23b. At this point, when tray 21 is pushed into a predetermined intermediate position, projection 22c of main body 22 comes into contact with a rear face of support plate 24a to which magnet 24 is fixed as illustrated in FIG. 7B.

Figure 7C:
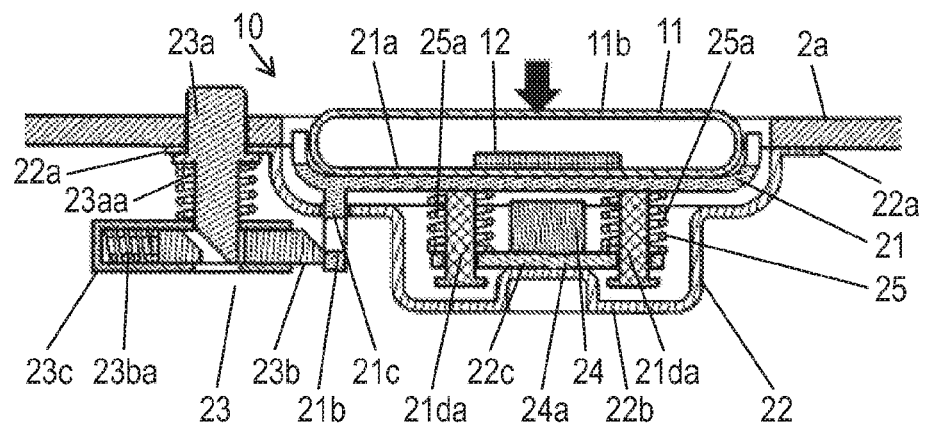
FIG. 7C is a sectional view illustrating the process of stowing the handset in the cradle device in the configuration of FIGS. 3 and 4.

Then, as illustrated in FIG. 7C, when handset 11 is further pushed in, since the rear face of support plate 24a to which magnet 24 is fixed is in contact with projection 22c of main body 22, projection 22c relatively pushes up magnet 24 toward the rear face of tray 21. At this point, springs 25a, 25a of retracting mechanism 25 are gradually contracted.

Figure 7D:
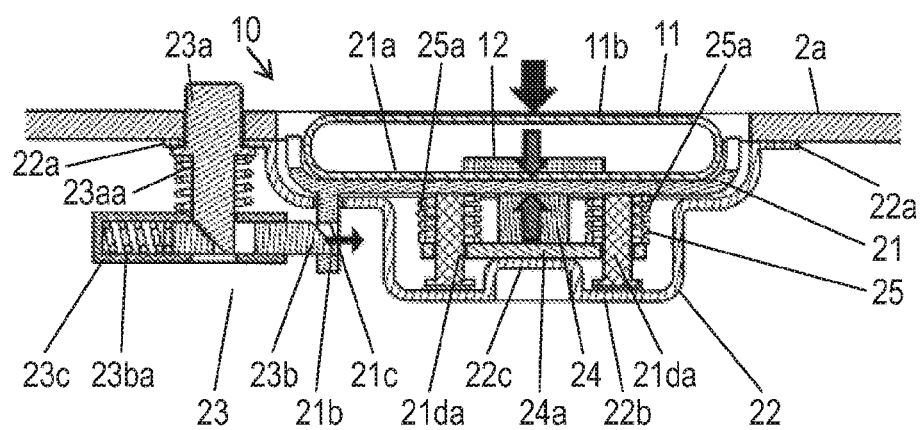
FIG. 7D is a sectional view illustrating the process of stowing the handset in the cradle device in the configuration of FIGS. 3 and 4.

Then, as illustrated in FIG. 7D, when handset 11 is pushed in until display screen 11b of handset 11 becomes substantially level with back face 2a, magnet 24 is pushed up to the attracting position at which magnet 24 comes into contact with the rear face of tray 21 and again attracts attraction plate 12 inside handset 11.

Accordingly, the attracted state between magnet 24 and attraction plate 12 is not restored until a user pushes in handset 11 to move tray 21 to the stowing position. Thus, when a user stops an operation of pushing in handset 11 halfway, handset 11 in which the attraction force by magnet 24 is not generated immediately drops off. Therefore, it is possible to prevent a user from misunderstanding that handset 11 has been stowed though handset 11 is actually insufficiently stowed. As a result, it is possible to prevent handset 11 from unexpectedly dropping off cradle device 10 due to an insufficiently stowed state of handset 11. In particular, even when cradle device 10 is embedded sideways in back face 2a of backrest 2 of seat 1 as illustrated in FIG. 1, handset 11 can be reliably held at the stowing position. Thus, it is possible to reliably prevent handset 11 from dropping off.

Timing of restoring the attracted state between magnet 24 and attraction plate 12 when handset 11 is stowed is not limited to the timing at which handset 11 is pushed in as illustrated in FIG. 7D, and may be timing immediately before tray 21 is shifted to the stowing position illustrated in FIG. 7C. The same applies to each exemplary embodiment described below.

Second Exemplary Embodiment

Cradle device 100 according to a second exemplary embodiment of the present disclosure will be described with reference to FIGS. 8 to 11C as follows. For the convenience of description, a member having the same shape and function as the member of the first exemplary embodiment will be designated by the same reference sign, and description thereof will be omitted.

FIG. 8 is a sectional view illustrating a state in which handset 11 is stowed in cradle device 100 according to the second exemplary embodiment of the present disclosure. As illustrated in FIG. 8, cradle device 100 of the present exemplary embodiment differs from that of the first exemplary embodiment in that cradle device 100 is not provided with a retracting mechanism which moves magnet 24 from an attracting position to a retracting position when handset 11 is detached at a taking-out position. That is, in a configuration of the present exemplary embodiment, when handset 11 is detached, magnet 24 is allowed to freely fall by the gravity so as to move to the retracting position.

More specifically, as illustrated in FIG. 8, cradle device 100 of the present exemplary embodiment is provided with tray 21, main body 122, and pop-up mechanism 23.

As illustrated in FIG. 8, main body 122 is a receiving member which supports tray 21 from a lower side and houses magnet 24 in a space formed between main body 122 and a rear face of tray 21. Main body 122 includes fixing part 122a, bottom 122b, fall space 122c, and wall 122d.

As illustrated in FIG. 8, fixing part 122a is a flange-like part which is formed in parallel to attachment face 102a along a substantially horizontal direction and fixed to a rear face of attachment face 102a. Accordingly, main body 122 is attached to attachment face 102a.

As illustrated in FIG. 8, bottom 122b is a part which forms a bottom face of main body 122 and forms fall space 122c which is used when magnet 24 freely falls.

As illustrated in FIG. 8, fall space 122c is located on substantially a center of the space which is formed between main body 122 and the rear face of tray 21. Fall space 122c is partitioned from the other space by wall 122d.

Wall 122d is a cylindrical part which stands on bottom 122b corresponding to a size of magnet 24. Wall 122d is arranged to surround an outer periphery of magnet 24 in and between a stowing position illustrated in FIG. 9A and a taking-out position illustrated in FIG. 10B (described below).

(Process of Taking Out Handset 11 from Cradle Device 100)

In cradle device 100 of the present exemplary embodiment, when handset 11 in a stowed state is taken out and used, tray 21 is shifted from the stowing position to the taking-out position by the following process.

Figure 9A:
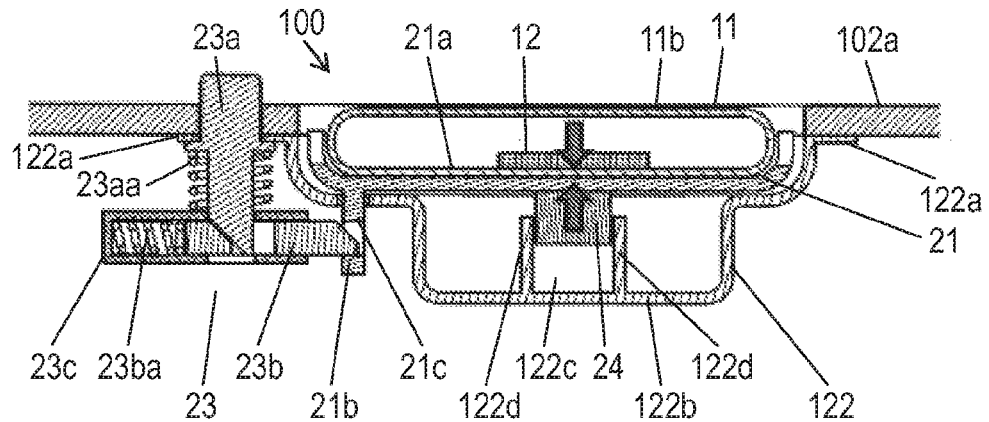
FIG. 9A is a sectional view illustrating a process of taking out the handset from the cradle device in a configuration of FIG. 8.

FIGS. 9A to 9C and FIGS. 10A and 10B are sectional views illustrating a process of taking out handset 11 from cradle device 100 in a configuration in FIG. 8. As illustrated in FIG. 9A, when handset 11 is set on mounting face 21a of tray 21 and tray 21 is located at the stowing position, attraction plate 12 inside handset 11 and magnet 24 are attracted to each other. Accordingly, handset 11 is attracted on tray 21 and thus prevented from dropping off attachment face 102a.

Figure 9B:
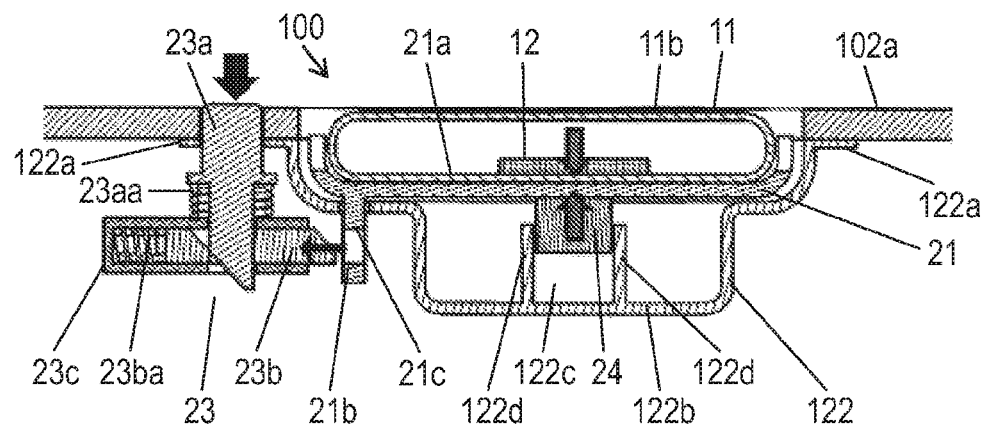
FIG. 9B is a sectional view illustrating the process of taking out the handset from the cradle device in the configuration of FIG. 8.

Then, as illustrated in FIG. 9B, when a user depresses release button 23a, locker 23b moves to retract, and a tip of locker 23b is removed from lock hole 21c of tray 21.

Figure 9C:
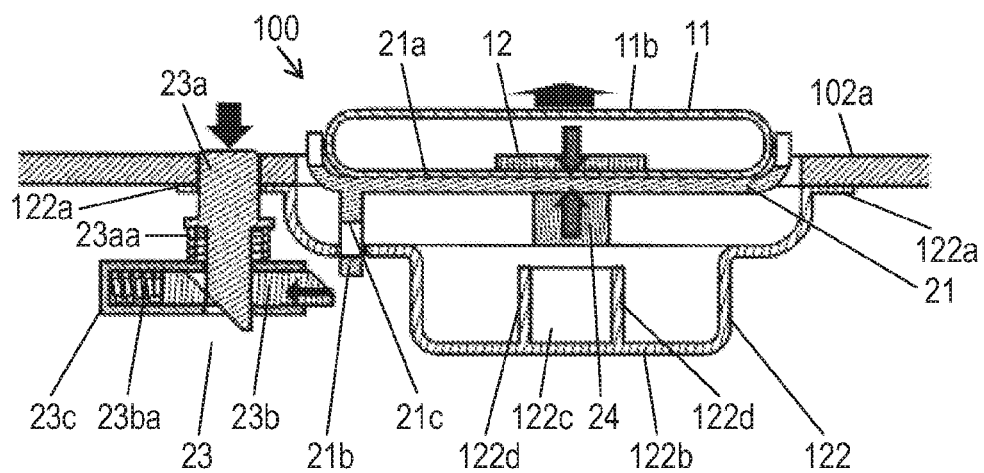
FIG. 9C is a sectional view illustrating the process of taking out the handset from the cradle device in the configuration of FIG. 8.

Accordingly, as illustrated in FIG. 9C, lock of tray 21 is released, and tray 21 moves to project from attachment face 102a by pop-up mechanism 23. As illustrated in FIG. 6A, the movement of tray 21 by pop-up mechanism 23 is caused by an elastic force of springs 23d, 23d contracted at the stowing position in response to the retraction of locker 23b from lock hole 21c of tray 21 in the same manner as in the above exemplary embodiment.

Figure 10A:
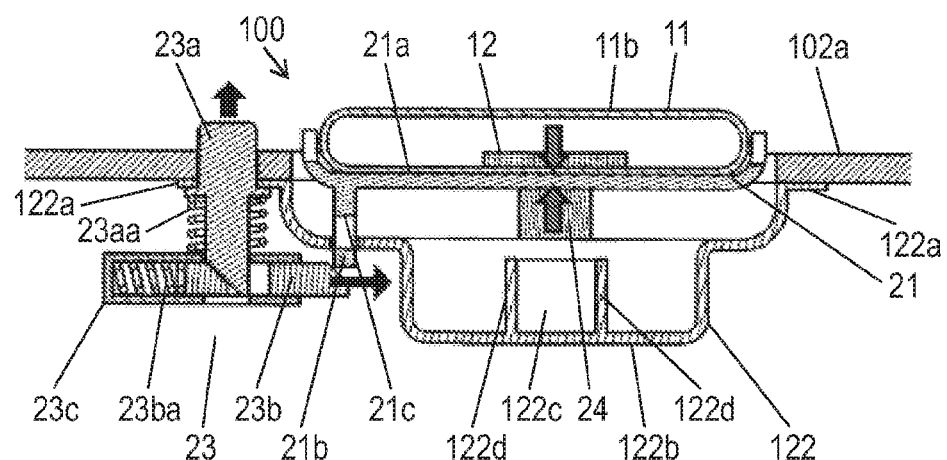
FIG. 10A is a sectional view illustrating the process of taking out the handset from the cradle device in the configuration of FIG. 8.

Then, as illustrated in FIG. 10A, when the user moves his/her hand off release button 23a, release button 23a is returned to an initial position, and locker 23b interlocking with release button 23a is also returned to an initial position at which locker 23b is locked to lock hole 21c. At this point, since tray 21 has moved to the taking-out position, the tip of locker 23b is not inserted into lock hole 21c, but moves to a position directly under lock receiver 21b. When tray 21 is shifted to the taking-out position, the attracted state between magnet 24 and attraction plate 12 inside handset 11 is maintained.

Figure 10B:
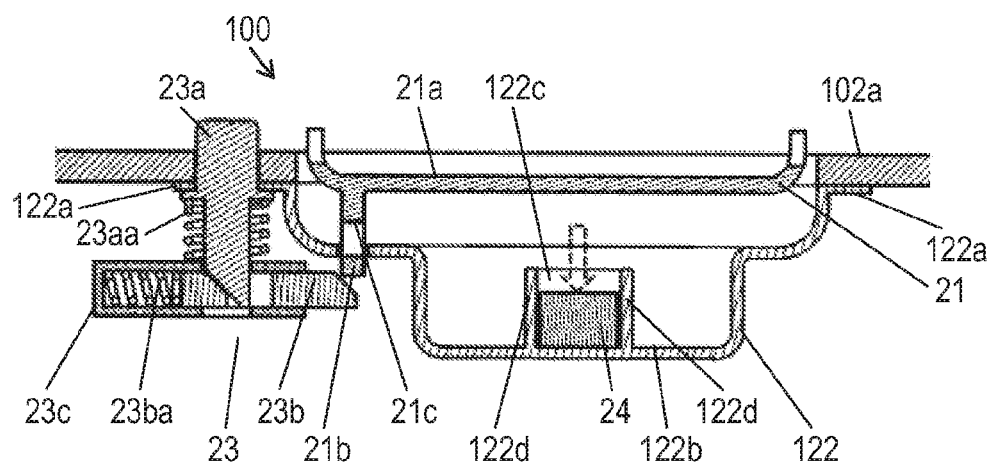
FIG. 10B is a sectional view illustrating the process of taking out the handset from the cradle device in the configuration of FIG. 8.

Then, as illustrated in FIG. 10B, when the user detaches handset 11 from tray 21 at the taking-out position, attraction plate 12 inside handset 11 is separated from magnet 24. Accordingly, an attraction force of magnet 24 does not act, and magnet 24 moves in a direction away from the rear face of tray 21 inside fall space 122c by free fall caused by the gravity. Accordingly, magnet 24 moves to a retracting position illustrated in FIG. 10B (a lowest part of fall space 122c).

As described above, in the present exemplary embodiment, means for moving magnet 24 to the retracting position depends on the gravity applied to magnet 24. Thus, in principle, cradle device 100 of the present exemplary embodiment is placed such that tray 21 moves along substantially a vertical direction. This configuration eliminates the need for a mechanism for moving magnet 24 to the retracting position and enables the configuration to be simplified.

(Process of Stowing Handset 11 in Cradle Device 100)

In cradle device 100 of the present exemplary embodiment, when a user stows handset 11 in cradle device 100 after use, handset 11 is shifted to the stowing position by the following process.

Figure 11A:
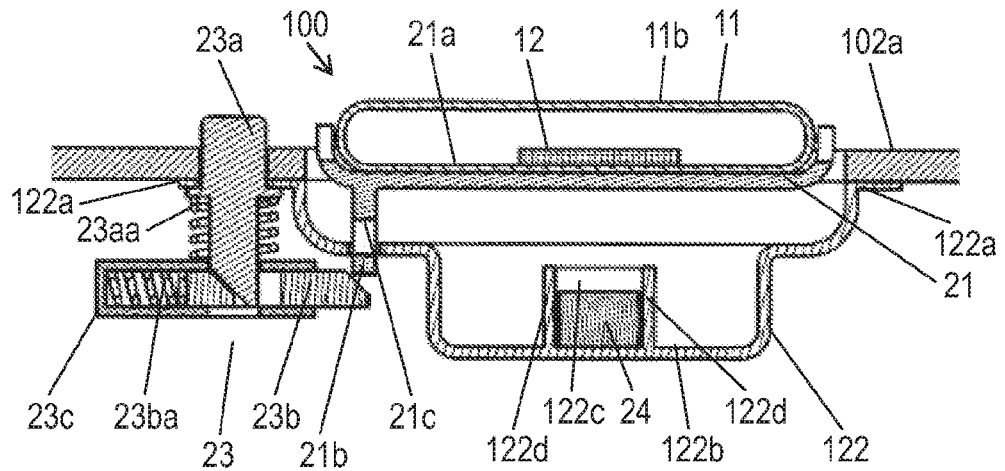
FIG. 11A is a sectional view illustrating a process of stowing the handset in the cradle device in the configuration of FIG. 8.
Figure 11B:
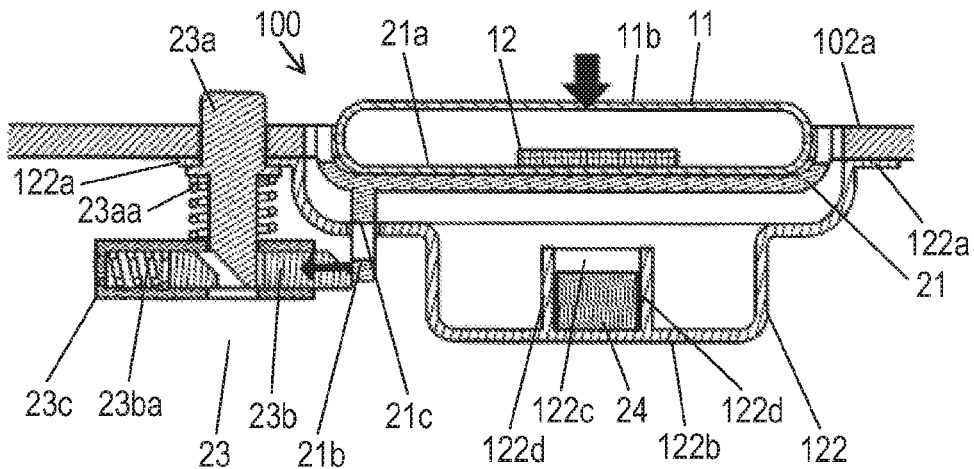
FIG. 11B is a sectional view illustrating the process of stowing the handset in the cradle device in the configuration of FIG. 8.
Figure 11C:
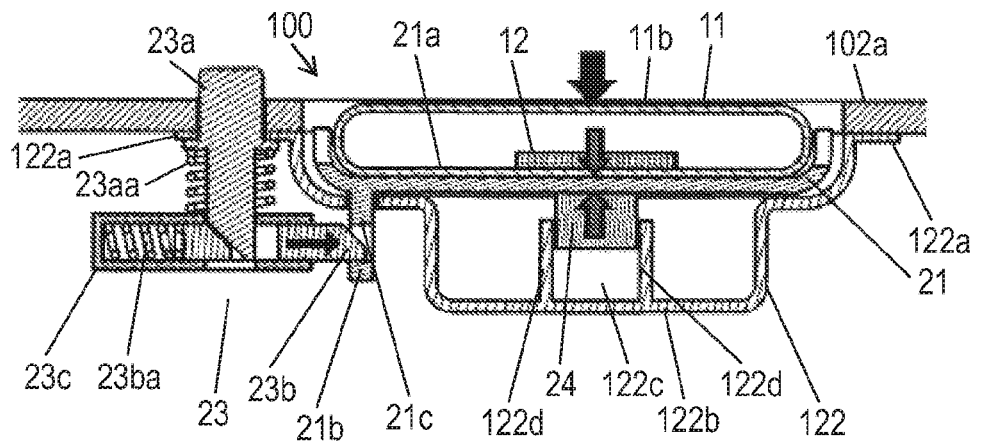
FIG. 11C is a sectional view illustrating the process of stowing the handset in the cradle device in the configuration of FIG. 8.

FIGS. 11A to 11C are sectional views illustrating a process of stowing handset 11 in cradle device 100 in the configuration of FIG. 8. As illustrated in FIG. 11A, a user first sets handset 11 on mounting face 21a of tray 21. At this point, merely setting handset 11 on mounting face 21a of tray 21 does not cause an attracted state between attraction plate 12 and magnet 24, and magnet 24 is maintained at the lowest part of fall space 122c (retracting position).

Then, as illustrated in FIG. 11B, when the user pushes handset 11 toward attachment face 102a, tray 21 on which handset 11 is set moves toward bottom 122b of main body 122.

Then, as illustrated in FIG. 11C, when handset 11 is further pushed in to allow display screen 11b of handset 11 to become substantially level with attachment face 102a, magnet 24 comes close to the rear face of tray 21 and the attraction force to attraction plate 12 is thus generated. Accordingly, since attraction force of magnet 24 becomes larger than the gravity, magnet 24 moves to the attracting position at which magnet 24 comes into contact with the rear face of tray 21 to again attract attraction plate 12 inside handset 11.

Accordingly, the attracted state between magnet 24 and attraction plate 12 is not restored until a user pushes in handset 11 to move tray 21 to the stowing position. Thus, when a user stops an operation of pushing in handset 11 halfway, handset 11 in which the attraction force by magnet 24 is not generated is not held by cradle device 100. Therefore, it is possible to prevent a user from misunderstanding that handset 11 has been stowed though handset 11 is actually insufficiently stowed. As a result, it is possible to prevent handset 11 from unexpectedly dropping off cradle device 100 due to an insufficiently stowed state of handset 11.

Third Exemplary Embodiment

Cradle device 200 according to a third exemplary embodiment of the present disclosure will be described with reference to FIGS. 12 to 15D as follows.

For the convenience of description, a member having the same shape and function as the member of the first and second exemplary embodiments will be designated by the same reference sign, and description thereof will be omitted.

Figure 12:
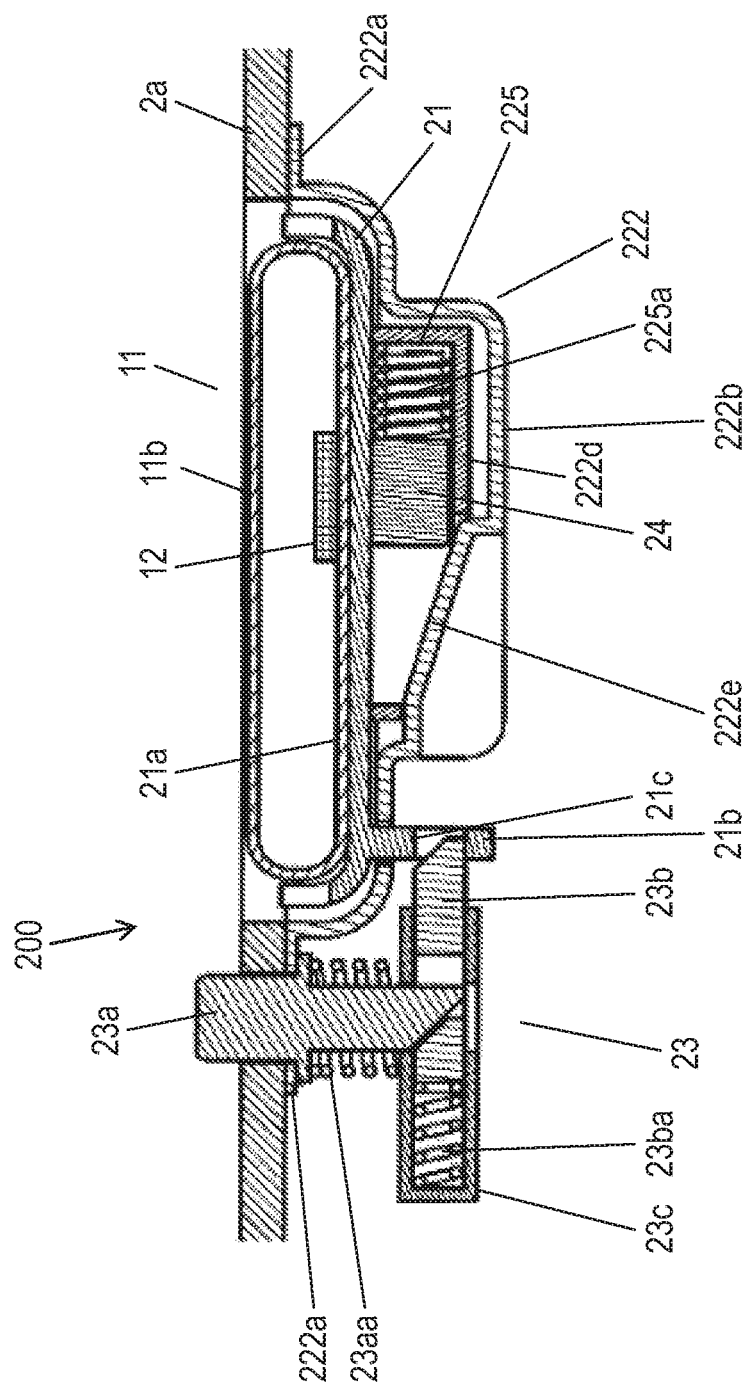
FIG. 12 is a sectional view illustrating a state in which a handset is stowed in a cradle device according to a third exemplary embodiment of the present disclosure.

FIG. 12 is a sectional view illustrating a state in which handset 11 is stowed in cradle device 200 according to the third exemplary embodiment of the present disclosure. As illustrated in FIG. 12, cradle device 200 of the present exemplary embodiment differs from that of the first exemplary embodiment in that cradle device 200 is provided with a mechanism for moving magnet 24 in a transverse direction, that is, a direction substantially parallel to back face 2a as retracting mechanism 225 which moves magnet 24 from an attracting position to a retracting position when handset 11 is detached at a taking-out position.

More specifically, as illustrated in FIG. 12, cradle device 200 of the present exemplary embodiment is provided with tray 21, main body 222, pop-up mechanism 23, and retracting mechanism 225.

As illustrated in FIG. 12, main body 222 is a receiving member which supports tray 21 from a lower side and houses magnet 24 and retracting mechanism 225 in a space formed between main body 222 and a rear face of tray 21. Main body 222 includes fixing part 222a, bottom 222b, case 222d, and inclined face 222e.

As illustrated in FIG. 12, fixing part 222a is a flange-like part which is formed in parallel to back face (attachment face) 2a of backrest 2 of seat 1 and fixed to the rear face of back face 2a. Accordingly, main body 222 is attached to back face 2a.

As illustrated in FIG. 12, bottom 222b is a part which forms a bottom face of main body 122 and forms a space for housing magnet 24 and retracting mechanism 225 in a clearance between bottom 222b and the rear face of tray 21.

As illustrated in FIG. 12, case 222d is a rectangular member which is attached to the rear face of tray 21. Magnet 24 and spring (first elastic member) 225a are housed sideways in an internal space of case 222d.

Magnet 24 is arranged in a manner to align a magnetic pole direction of magnet 24 with an up-down direction in FIG. 12 and with a direction perpendicular to a direction of an elastic force applied by spring 225a.

Magnet 24 is housed movably in the transverse direction in the internal space of case 222d.

Case 222d has an opening which is formed for allowing an end of magnet 24 to come into contact with inclined face 222e in a process of stowing handset 11 (described below).

Inclined face (driving mechanism) 222e is formed between bottom 222b of main body 222 and locker 23b and inclined downward in a direction away from locker 23b. An inclined face (driving mechanism) for moving magnet 24 may be formed on an opposite side of the locker.

Accordingly, when handset 11 is shifted to a stowed state (described below), inclined face 222e comes into contact with the end of magnet 24, which enables magnet 24 to move from the retracting position to the attracting position.

When tray 21 is shifted from a stowing position (refer to FIG. 13A) to a taking-out position (refer to FIG. 14B) and handset 11 is detached from tray 21, retracting mechanism 225 moves magnet 24 from the attracting position to the retracting position. As illustrated in FIG. 12, retracting mechanism 225 has spring (first elastic member) 225a.

As illustrated in FIG. 12, spring (first elastic member) 225a is inserted inside case 222d. Spring 225a is interposed between a bottom face of case 222d and a side face of magnet 24 and biases magnet 24 such that magnet 24 moves from the attracting position to the retracting position on the rear face side of tray 21 by the elastic force.

An attraction force Fmg of magnet 24 is set to satisfy the following relational expression in a relationship with a size of the elastic force Fsp of spring 225a.

$\mu \times Fmg > Fsp$ (where, $\mu$ denotes a friction coefficient between magnet 24 and the rear face of tray 21)

That is, when magnet 24 and spring 225a are in a positional relationship illustrated in FIG. 12, the elastic force Fsp of spring 225a is set to be smaller than a frictional force $\mu \times Fmg$ generated by the attraction force Fmg of magnet 24.

Thus, when handset 11 is located at the stowing position (refer to FIG. 13A) of tray 21, magnet 24 is not moved from the attracting position on the rear face of tray 21 by the elastic force of spring 225a, but held at the predetermined attracting position by the attraction force of magnet 24.

When handset 11 is detached from the taking-out position (refer to FIG. 14B) of tray 21, the attraction force of magnet 24 does not act and magnet 24 is moved from the attracting position to the retracting position by the elastic force of spring 225a.

(Process of Taking Out Handset 11 from Cradle Device 200)

In cradle device 200 of the present exemplary embodiment, when handset 11 in a stowed state is taken out and used, tray 21 is shifted from the stowing position to the taking-out position by the following process.

Figure 13A:
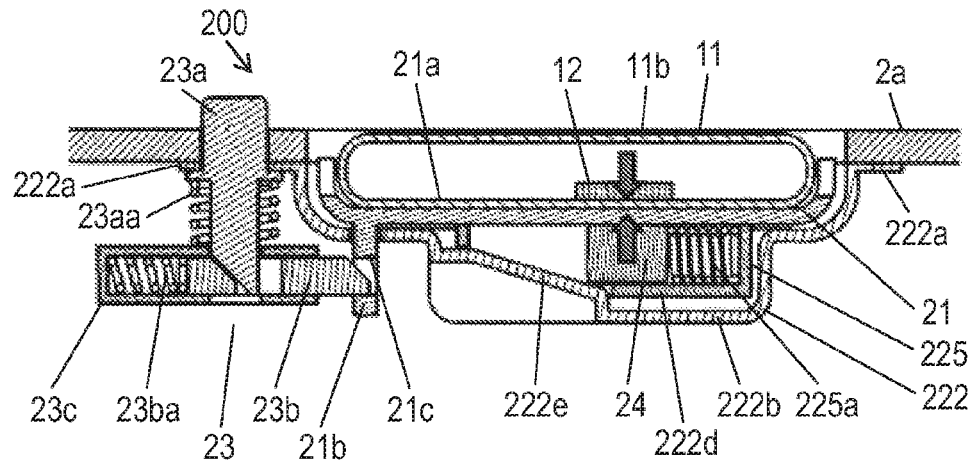
FIG. 13A is a sectional view illustrating a process of taking out the handset from the cradle device in a configuration of FIG. 12.

FIGS. 13A to 13C and FIGS. 14A and 14B are sectional views illustrating a process of taking out handset 11 from cradle device 200 in a configuration in FIG. 12. As illustrated in FIG. 13A, when handset 11 is set on mounting face 21a of tray 21 and tray 21 is located at the stowing position, attraction plate 12 inside handset 11 and magnet 24 are attracted to each other. Accordingly, handset 11 is attracted on tray 21 and thus prevented from dropping off back face 2a of backrest 2 of seat 1.

Figure 13B:
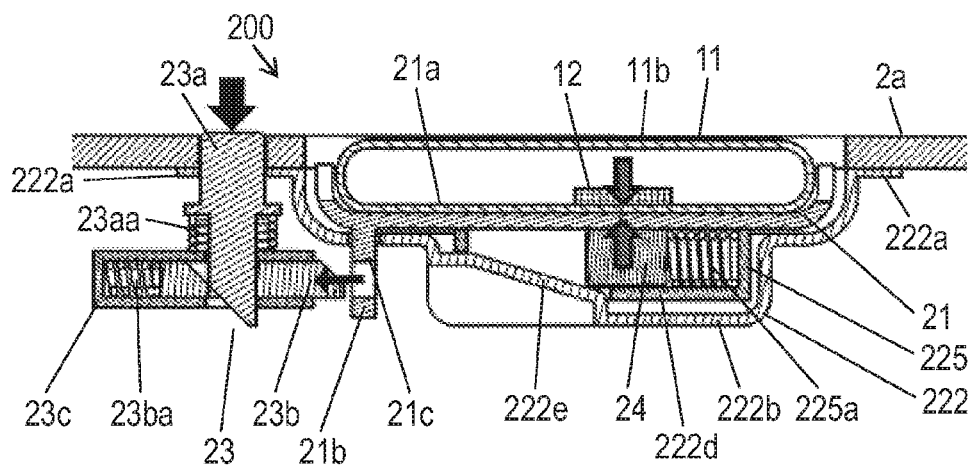
FIG. 13B is a sectional view illustrating the process of taking out the handset from the cradle device in the configuration of FIG. 12.

Then, as illustrated in FIG. 13B, when a user depresses release button 23a, locker 23b moves to retract, and a tip of locker 23b is removed from lock hole 21c of tray 21.

Figure 13C:
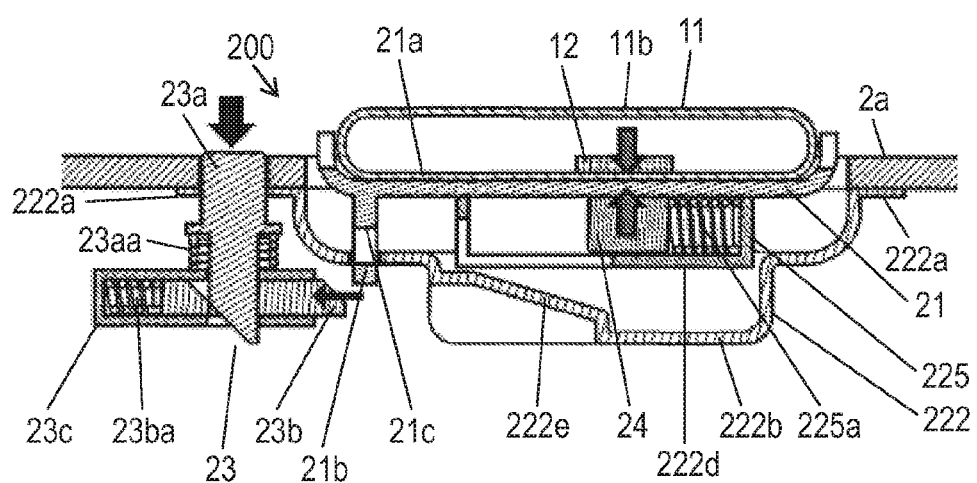
FIG. 13C is a sectional view illustrating the process of taking out the handset from the cradle device in the configuration of FIG. 12.

Accordingly, as illustrated in FIG. 13C, lock of tray 21 is released, and tray 21 moves to project from back face 2a by pop-up mechanism 23. As illustrated in FIG. 6A, the movement of tray 21 by pop-up mechanism 23 is caused by an elastic force of springs 23d, 23d contracted at the stowing position in response to the retraction of locker 23b from lock hole 21c of tray 21 in the same manner as in the above exemplary embodiments.

Figure 14A:
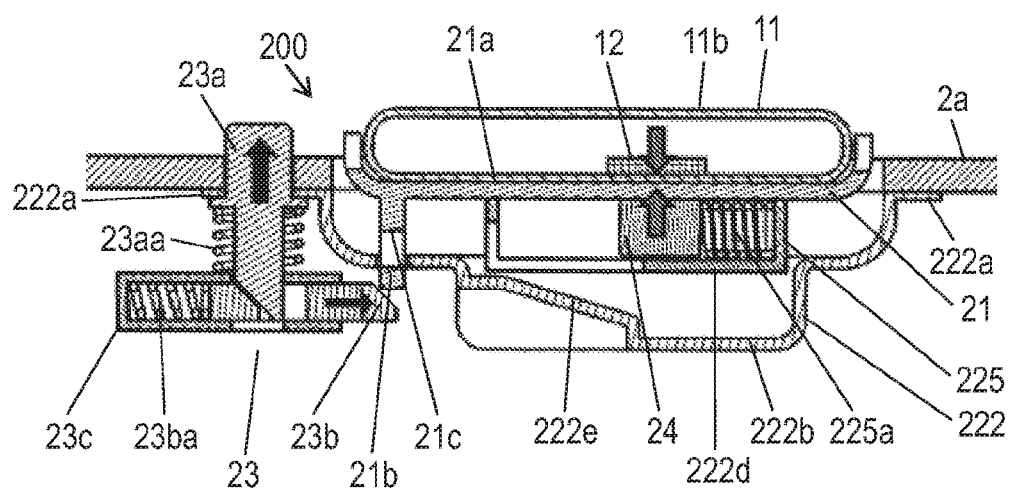
FIG. 14A is a sectional view illustrating the process of taking out the handset from the cradle device in the configuration of FIG. 12.

Then, as illustrated in FIG. 14A, when the user moves his/her hand off release button 23a, release button 23a is returned to an initial position, and locker 23b interlocking with release button 23a is also returned to an initial position at which locker 23b is locked to lock hole 21c. At this point, since tray 21 has moved to the taking-out position, the tip of locker 23b is not inserted into lock hole 21c, but moves to a position directly under lock receiver 21b. When tray 21 is shifted to the taking-out position, the attracted state between magnet 24 and attraction plate 12 inside handset 11 is maintained.

Figure 14B:
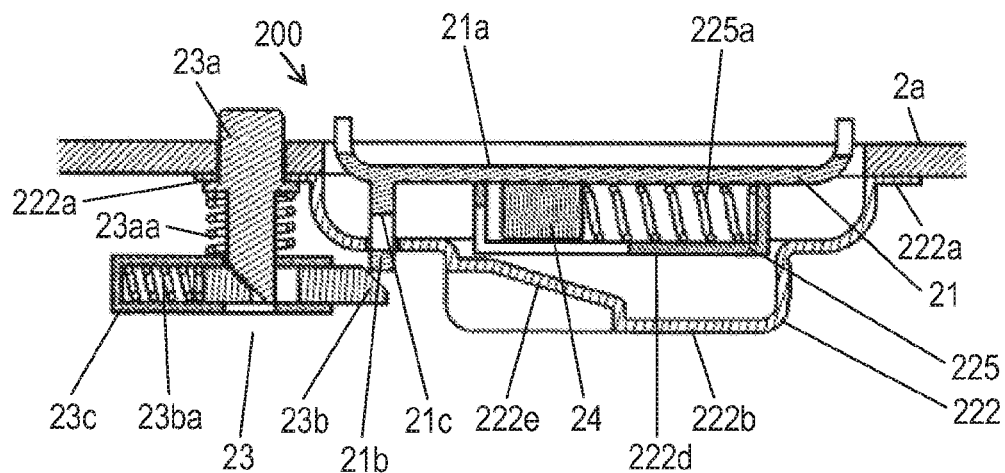
FIG. 14B is a sectional view illustrating the process of taking out the handset from the cradle device in the configuration of FIG. 12.

Then, as illustrated in FIG. 14B, when the user detaches handset 11 from tray 21 at the taking-out position, attraction plate 12 inside handset 11 is separated from magnet 24. Accordingly, the attraction force of magnet 24 does not act, and magnet 24 moves toward locker 23b along the rear face of tray 21 by the elastic force of spring 225a of retracting mechanism 225 up to the predetermined retracting position (an end near locker 23b inside case 222d) illustrated in FIG. 14B.

(Process of Stowing Handset 11 in Cradle Device 200)

In cradle device 200 of the present exemplary embodiment, when a user stows handset 11 in cradle device 200 after use, handset 11 is shifted to the stowing position by the following process.

Figure 15A:
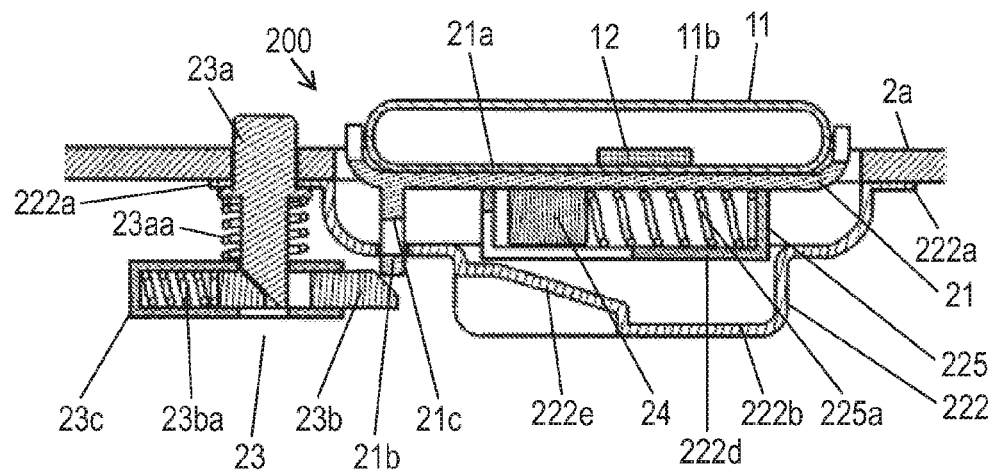
FIG. 15A is a sectional view illustrating a process of stowing the handset in the cradle device in the configuration of FIG. 12.

FIGS. 15A to 15D are sectional views illustrating a process of stowing handset 11 in cradle device 200 in the configuration of FIG. 12. As illustrated in FIG. 15A, a user first sets handset 11 on mounting face 21a of tray 21.

At this point, merely setting handset 11 on mounting face 21a of tray 21 does not cause an attracted state between attraction plate 12 and magnet 24, and magnet 24 is maintained at the retracting position deviated from a position directly under attraction plate 12.

Figure 15B:
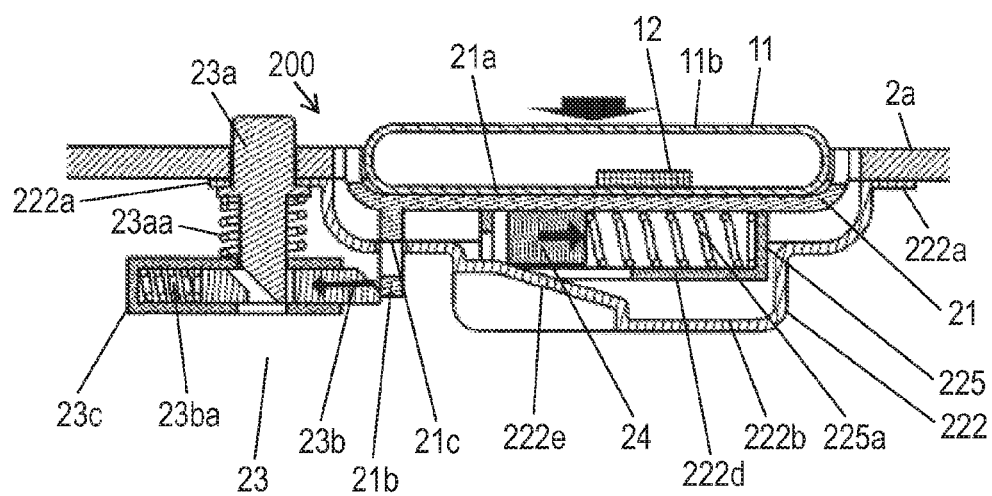
FIG. 15B is a sectional view illustrating the process of stowing the handset in the cradle device in the configuration of FIG. 12.

Then, as illustrated in FIG. 15B, when the user pushes handset 11 toward back face 2a, a lower end of lock receiver 21b of tray 21 moves to a deep side of back face 2a while making contact with an inclined part formed on the tip of locker 23b. At this point, when tray 21 is pushed into a predetermined intermediate position, an end of magnet 24, the end near locker 23b, housed inside case 222d comes into contact with inclined face 222e of main body 222 as illustrated in FIG. 15B.

Figure 15C:
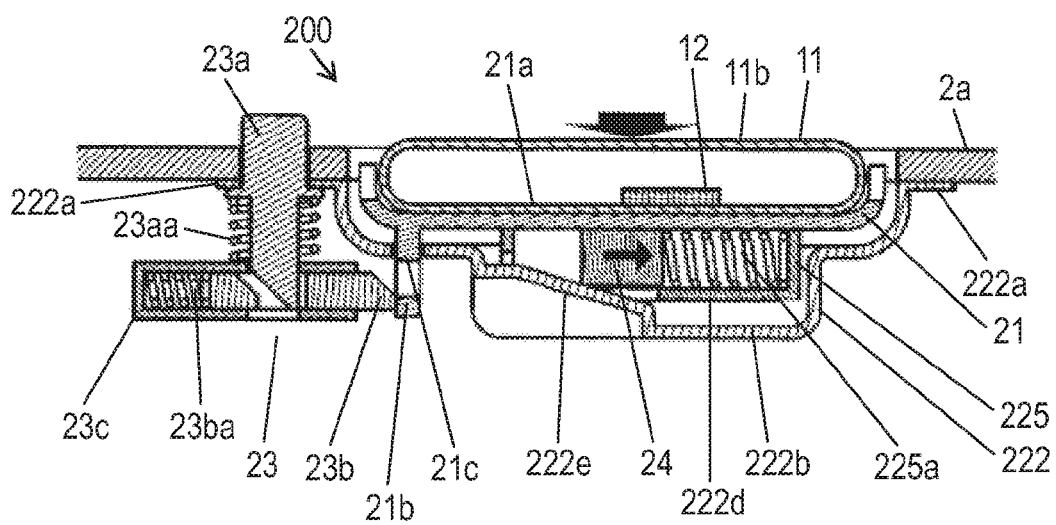
FIG. 15C is a sectional view illustrating the process of stowing the handset in the cradle device in the configuration of FIG. 12.

Then, as illustrated in FIG. 15C, when handset 11 is further pushed in, magnet 24 moves to contract spring 225a of retracting mechanism 225 while making contact with inclined face 222e.

Figure 15D:
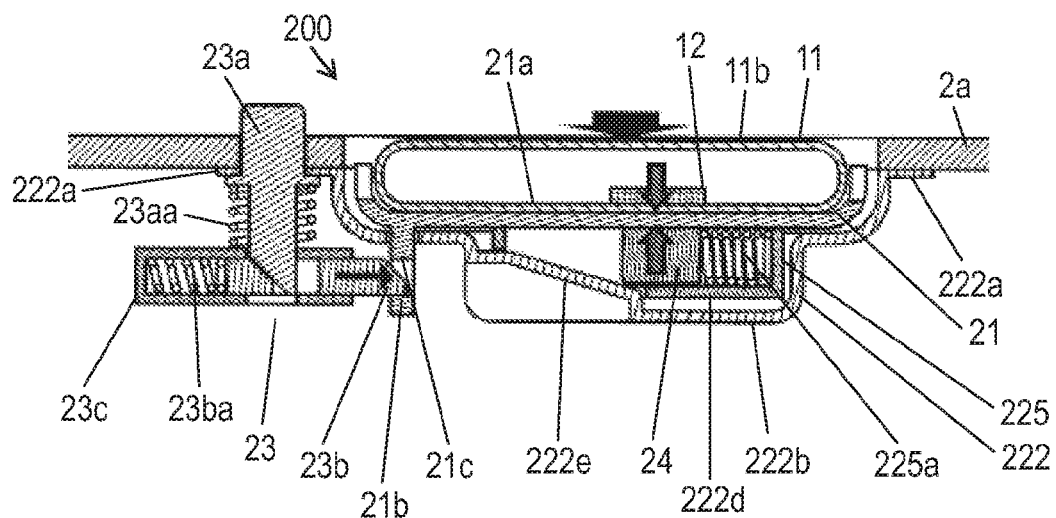
FIG. 15D is a sectional view illustrating the process of stowing the handset in the cradle device in the configuration of FIG. 12.

Then, as illustrated in FIG. 15D, when handset 11 is pushed in until display screen 11b of handset 11 becomes substantially level with back face 2a, magnet 24 is moved to the attracting position by inclined face 222e and again attracts attraction plate 12 inside handset 11.

Accordingly, the attracted state between magnet 24 and attraction plate 12 is not restored until a user pushes in handset 11 to move tray 21 to the stowing position. Thus, when a user stops an operation of pushing in handset 11 halfway, handset 11 in which the attraction force by magnet 24 is not generated immediately drops off. Therefore, it is possible to prevent a user from misunderstanding that handset 11 has been stowed though handset 11 is actually insufficiently stowed. As a result, it is possible to prevent handset 11 from unexpectedly dropping off cradle device 200 due to an insufficiently stowed state of handset 11. In particular, even when cradle device 200 is embedded sideways in back face 2a of backrest 2 of seat 1 as illustrated in FIG. 1, handset 11 can be reliably held at the stowing position. Thus, it is possible to reliably prevent handset 11 from dropping off.

Other Exemplary Embodiments

The first to third exemplary embodiments have been described as examples of the technique disclosed in the present application. However, the technique in the present disclosure is not limited to these exemplary embodiments, and also applicable to embodiments in which modifications, replacements, additions, and omissions are made. The elements described in the above first to third exemplary embodiments may be combined to form a new embodiment.

Hereinbelow, other exemplary embodiments will be described as examples.

(A)

In the first to third exemplary embodiments, there has been described an example in which pop-up mechanism 23 shifts tray 21 from the stowing position to the taking-out position while maintaining tray 21 substantially parallel to the attachment face. However, the present disclosure is not limited to this configuration.

Figure 16A:
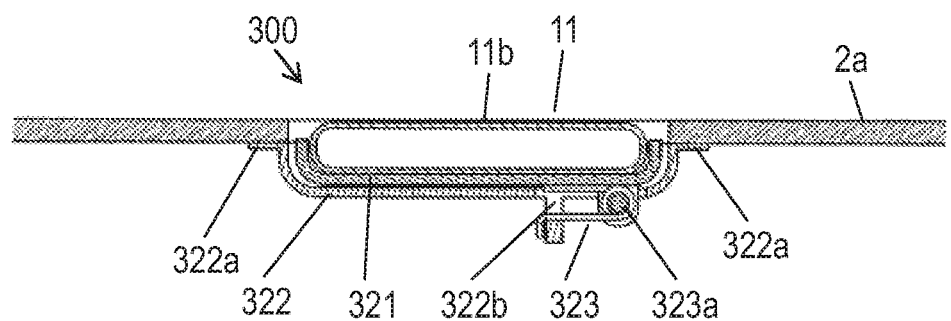
FIG. 16A is a sectional view illustrating a configuration that employs another pop-up mechanism with a handset stowed in a cradle device according to another exemplary embodiment of the present disclosure.
Figure 16B:
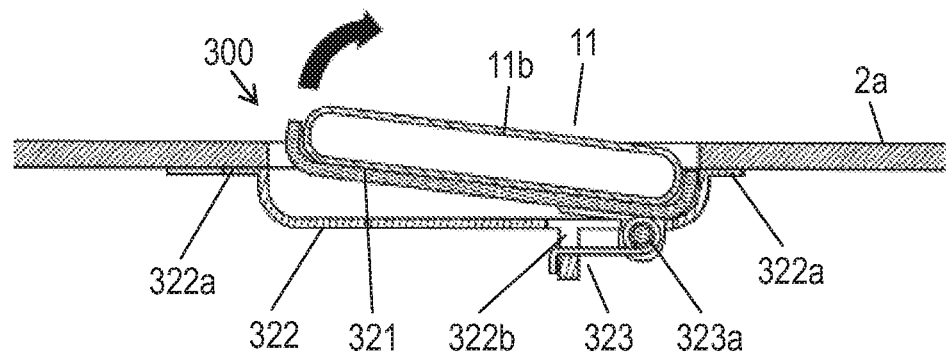
FIG. 16B is a sectional view illustrating the configuration that employs another pop-up mechanism with the handset stowed in the cradle device according to another exemplary embodiment of the present disclosure.

For example, as illustrated in FIGS. 16A and 16B, a cantilever pop-up system may be employed. Specifically, only one end of tray 21 may be lifted without moving tray 21 maintained parallel to the attachment face.

The sectional views of FIGS. 16A and 16B correspond to a position of line B-B illustrated in FIG. 2.

Specifically, as illustrated in FIG. 16A, cradle device 300 of the present exemplary embodiment is provided with tray 321, main body 322, and pop-up mechanism 323.

As illustrated in FIG. 16A, main body 322 is a receiving member which supports tray 321 from a lower side and arranged in proximal to a rear face of tray 321. Main body 322 includes fixing part 322a and locking hole 322b.

As illustrated in FIG. 16A, fixing part 322a is a flange-like part which is formed in parallel to back face (attachment face) 2a of backrest 2 of seat 1 and fixed to the rear face of back face 2a. Accordingly, main body 322 is attached to back face 2a.

Locking hole 322b is an opening which is formed on a bottom part of main body 322 and locks a first end of torsion spring 323a (described below).

Pop-up mechanism 323 shifts tray 321 from the stowing position to the taking-out position and, in contrast, from the taking-out position to the stowing position and includes torsion spring 323a as illustrated in FIG. 16A.

Torsion spring 323a is arranged with the first end abutting against locking hole 322b and a second end abutting against the rear face of tray 321.

When release button 23a described in the above exemplary embodiments is depressed, as illustrated in FIG. 16B, torsion spring 323a shifts tray 321 to the taking-out position by obliquely lifting one side of tray 321 by the elastic force.

Accordingly, a user can obtain an effect similar to the effect of each of the above exemplary embodiments by detaching handset 11 from tray 321 by holding the lifted end.

A driving source of the pop-up mechanism is not limited to a spring. For example, a plunger, a flat spring, a power spring, hydraulic pressure/air pressure, a ball screw, or a slide screw may be employed.

Further, a direction of pup-upping the tray by the pop-up mechanism is not limited to the direction illustrated in FIG. 1, and may be a right-left direction with respect to the back face of the backrest of the seat. In this case, for example, a release button may be arranged on a left end and a hinge or a torsion spring may be arranged on a right end.

(B)

In the above first and third exemplary embodiments, there has been described an example in which projection 22c formed on main body 22 (first exemplary embodiment) or inclined face 222e formed on main body 222 (third exemplary embodiment) is used as a mechanism for moving magnet 24 from the retracting position to the attracting position when handset 11 is stowed in cradle device 10. However, the present disclosure is not limited to this configuration.

For example, the driving mechanism for moving magnet 24 from the retracting position to the attracting position is not limited to the configuration disclosed in the above exemplary embodiments, and a driving mechanism that moves a magnet in a desired direction by combining a gear and a pinion which are driven interlocking with an up-down movement (pop-up) of the tray may be employed.

Alternatively, a plunger, a motor, a cam, a gear, or a pinion may be employed as the mechanism for moving the magnet from the retracting position to the attracting position. Further, a configuration using a pulley and a wire which are driven interlocking with an up-down movement of the tray may be employed.

(C)

In the above first to third exemplary embodiments, there has been described an example in which a part (lock hole 21c) of tray 21 on which handset 11 is mounted is locked by locker 23b as a mechanism for locking handset 11 at the stowing position. However, the present disclosure is not limited to this configuration.

Figure 17:
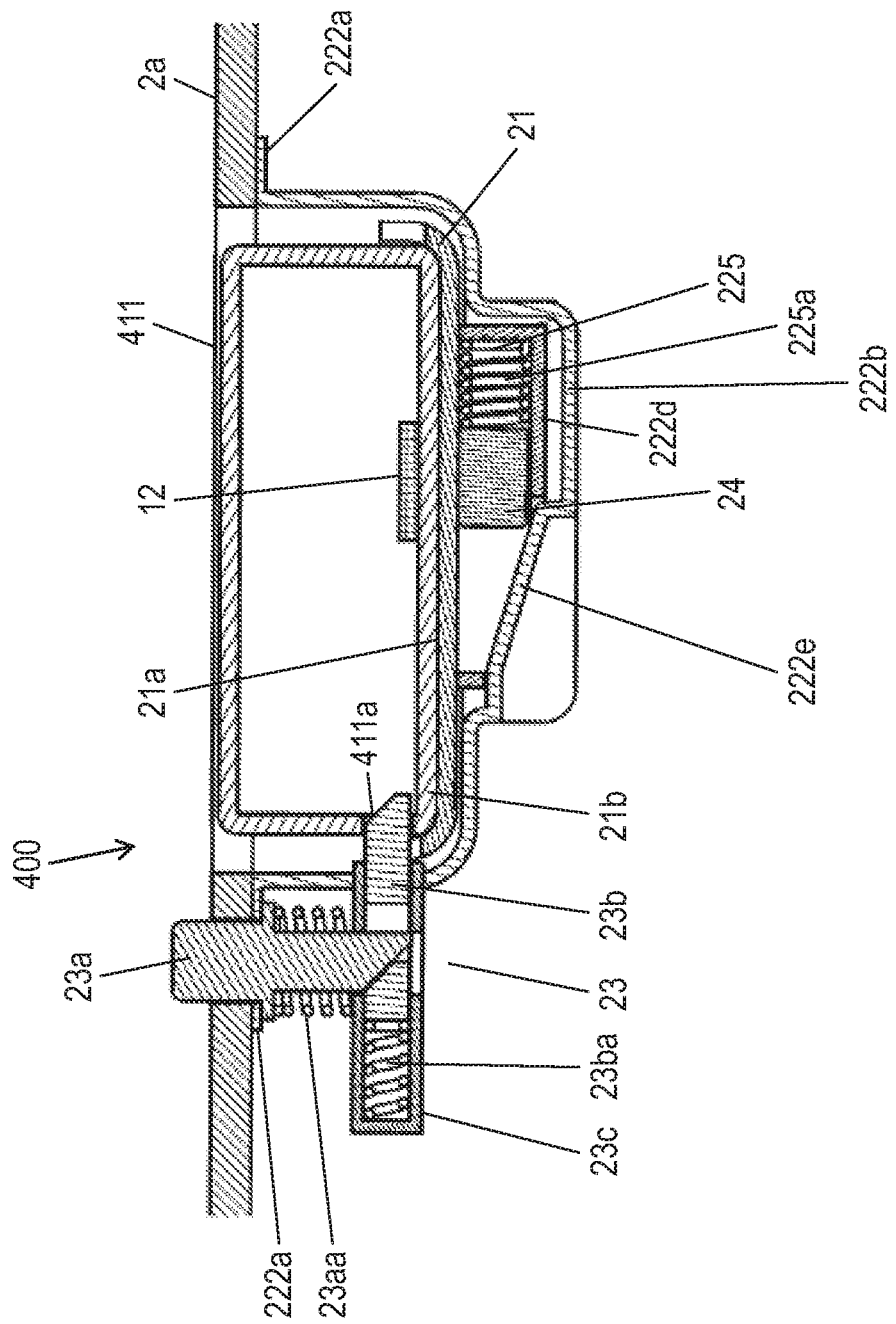
FIG. 17 is a sectional view illustrating a configuration of a cradle device according to still another exemplary embodiment of the present disclosure.

For example, as illustrated in FIG. 17, locker 23b may lock not a part of tray 21, but handset 411 itself.

Specifically, locking part 411a which is locked with locker 23b inserted is formed on handset 411.

Locking part 411a is formed on a side face of handset 411 and locks handset 411 in a stowed state.

Accordingly, in the same manner as in the first to third exemplary embodiments, a user can easily move handset 411 to the taking-out position by depressing release button 23a. Further, a handset can be more reliably locked by directly fixing the handset than when a tray is fixed. Thus, for example, even when cradle device 400 is installed in an airplane, it is possible to prevent the handset from dropping off by vibrations during flight.

As for the mechanism for locking the handset, a plunger, a combination of a motor, a cam, a gear and a pinion, an electromagnet, or magnetic force may be used instead of the above configuration.

(D)

In the above first to third exemplary embodiments, there has been described, as an example, a configuration in which magnet 24 is disposed on main body 22 of cradle device 10 and attraction plate 12 is disposed inside handset 11. However, the present disclosure is not limited to this configuration.

For example, the positions of the magnet and the attraction plate may be interchanged.

That is, the attraction plate may be disposed on the cradle device and the magnet may be disposed on the handset.

(E)

In the above first and third exemplary embodiments, there has been described an example in which cradle device 10, 200 according to the present disclosure is placed on back face 2a of backrest 2 of seat 1 in an airplane. However, the present disclosure is not limited to this configuration.

For example, an installation location of the cradle device is not limited to an airplane, and may be another transport means such as a train, a bus, and a ship.

Further, the attachment face may be an upper part of a backrest of a seat, an armrest on a lateral side of a seat, a wall face, or a floor face instead of the back face of the backrest.

(F)

In the above exemplary embodiments, there has been described, as an example, handset 11 used in an airplane as a terminal device which is attached to cradle device 10. However, the present disclosure is not limited to this configuration.

For example, a cradle device that stows a terminal device such as a mobile phone and various controllers may be employed.

(G)

In the above exemplary embodiments, there has been described an example in which pop-up mechanism 23 is arranged on each end in the longitudinal direction of tray 21. However, the present disclosure is not limited to this configuration.

For example, only one pop-up mechanism may be disposed on substantially the center in the longitudinal direction of tray 21.

When the configuration in which only one pop-up mechanism is disposed on substantially the center in the longitudinal direction of tray 21 is employed, a magnet may be disposed on either one of the ends in the longitudinal direction of the tray.

Also when such a configuration is employed, an effect similar to the effect of the above exemplary embodiments can be obtained.

The above exemplary embodiments are described for illustrating the technique in the present disclosure. Thus, various modifications, replacements, additions, and omissions may be made within the scope of the claims or the equivalents thereof.

What is claimed is:

1. A cradle device to which a terminal device is attached, the cradle device comprising:
   a tray having a mounting face on which the terminal device is mounted;
   a main body disposed on an attachment face, and supporting the tray from a side opposite to the mounting face;
   a pop-up mechanism disposed on the main body, and being configured to move the tray from a stowing position, at which the terminal device is stowed within the attachment face, to a taking-out position at which the terminal device is lifted with respect to the attachment face; and
   an attraction member disposed in the main body at a side opposite to the mounting face of the tray, wherein, in a case of taking out the terminal device, the attraction member attracts the terminal device toward the tray from the stowing position to the taking-out position and moves to a predetermined retracting position when the terminal device is taken out of the tray, and, in a case of returning the terminal device to the tray, the attraction member moves from the retracting position to an attracting position at which the terminal device is attracted toward the tray when the terminal device is pushed into the stowing position.

2. The cradle device according to claim 1 further comprising a retracting mechanism that moves the attraction member from the attracting position to the retracting position when the terminal device is taken out of the tray at the taking-out position.

3. The cradle device according to claim 2, wherein the retracting mechanism includes a first elastic member having an elastic force weaker than an attraction force of the attraction member.

4. The cradle device according to claim 2, wherein the retracting mechanism moves the attraction member in a direction substantially perpendicular to the attachment face.

5. The cradle device according to claim 2, wherein the retracting mechanism moves the attraction member in a direction substantially parallel to the attachment face.

6. The cradle device according to claim 1, wherein the attraction member moves from the attracting position to the retracting position by gravity when the terminal device is taken out of the tray at the taking-out position.

7. The cradle device according to claim 1 further comprising a driving mechanism that moves the attraction member from the retracting position to the attracting position when the terminal device is pushed into the stowing position for returning the terminal device to the tray.

8. The cradle device according to claim 7, wherein the driving mechanism has a projection formed on the main body, the projection projecting toward the tray.

9. The cradle device according to claim 7, wherein the driving mechanism has an inclined face formed on the main body, the inclined face guiding the attraction member so as to move from the retracting position to the attracting position as the terminal device is pushed into the stowing position.

10. The cradle device according to claim 1, wherein the pop-up mechanism includes
    a locker holding the tray locked at the stowing position,
    a release unit for releasing a locked state held by the locker, and a second elastic member for applying an elastic force for moving the tray to the taking-out position when the locked state held by the locker is released by the release unit.

11. The cradle device according to claim 1, wherein the pop-up mechanism moves the tray while maintaining the tray substantially parallel to the attachment face when the tray is shifted from the stowing position to the taking-out position.

12. The cradle device according to claim 1, wherein the pop-up mechanism moves the tray while tilting the tray so as to allow a first end of the terminal device to project with respect to the attachment face when the tray is shifted from the stowing position to the taking-out position.

13. The cradle device according to claim 1, wherein the attraction member is a magnet or an attraction plate attracted to a magnet disposed on the terminal device.

14. The cradle device according to claim 1, wherein the attachment face is a back face of a backrest of a seat or a face of an armrest of a seat installed in an airplane.

* * * * *